United States Patent
Schindler

(10) Patent No.: US 10,891,613 B1
(45) Date of Patent: Jan. 12, 2021

(54) METHODS AND SYSTEMS FOR GOVERNING USAGE-BASED LEASES UTILIZING BLOCKCHAIN CAPITAL

(71) Applicant: Keith William Schindler, Nipomo, CA (US)

(72) Inventor: Keith William Schindler, Nipomo, CA (US)

(73) Assignee: Keith Schindler, Nipomo, CA (US)

( * ) Notice: Subject to any disclaimer, the term of this patent is extended or adjusted under 35 U.S.C. 154(b) by 80 days.

(21) Appl. No.: 16/264,666

(22) Filed: Jan. 31, 2019

Related U.S. Application Data

(60) Provisional application No. 62/624,137, filed on Jan. 31, 2018.

(51) Int. Cl.
*G06Q 20/38* (2012.01)
*G06Q 20/36* (2012.01)
*G06F 16/23* (2019.01)

(52) U.S. Cl.
CPC ....... *G06Q 20/389* (2013.01); *G06F 16/2343* (2019.01); *G06Q 20/3678* (2013.01); *G06Q 2220/00* (2013.01)

(58) Field of Classification Search
None
See application file for complete search history.

(56) References Cited

U.S. PATENT DOCUMENTS

| | | |
|---|---|---|
| 8,633,799 B1 | 1/2014 | Aronson et al. |
| 8,682,804 B1 | 3/2014 | Yoon |
| 9,020,852 B2 | 4/2015 | Ricket |
| 9,818,092 B2 | 11/2017 | Pennanen |
| 2011/0213691 A1 | 9/2011 | Ferris et al. |
| 2012/0130890 A1 | 5/2012 | Nam |
| 2012/0173353 A1 | 7/2012 | Rausch et al. |
| 2013/0238496 A1 | 9/2013 | Monster et al. |
| 2016/0261411 A1* | 9/2016 | Yau ........................ G06F 21/445 |

(Continued)

FOREIGN PATENT DOCUMENTS

CN 107194778 A 9/2017

OTHER PUBLICATIONS

Rusnak, P. 'Trezor One Bootloader and Firmware'. Nov. 6, 2018. trezor-mcu-1.7.3.zip, Trezor github repositories. Retrieved from the internet. https://github.com/trezor/trezor-mcu/releases/tag/v1.7.3 Retrieved on Mar. 11, 2019.

(Continued)

*Primary Examiner* — Kaveh Abrishamkar

(57) ABSTRACT

A method and system comprise leasing of proprietary digitized items, or items containing digital processing components, where usage of items is enabled through digital processing means. Fungible blockchain currency amounts determine the degree of usage of items, where a finite amount of blockchain currency is available to lessors. Lessors may adjust their level of capitalization, allowing usage of items by lessees, by acquiring or disposing of blockchain currency in order to adjust to varying market demand for said items. In the case where blockchain currency represents cryptocurrency-based securities, owners of items or investors may profit by buying, selling and/or distributing said securities during varying market conditions.

20 Claims, 6 Drawing Sheets

Interactions between Entities with Associated Wallets

(56) References Cited

U.S. PATENT DOCUMENTS

| | | | |
|---|---|---|---|
| 2017/0178128 A1* | 6/2017 | Fourez | G06Q 20/38 |
| 2018/0089256 A1 | 3/2018 | Wright, Sr. | |
| 2019/0026716 A1* | 1/2019 | Anbukkarasu | G06Q 20/206 |
| 2019/0081789 A1* | 3/2019 | Madisetti | G06Q 20/401 |
| 2019/0130394 A1* | 5/2019 | Stollman | H04L 9/0637 |
| 2020/0143469 A1* | 5/2020 | Stewart | H04L 9/0643 |

OTHER PUBLICATIONS

Rusnak, P. 'Hardware design of Trezor'. Jul. 4, 2018. trezor-hw-master.zip, Trezor github repositories. Retrieved from the internet. https://github.com/trezor/trezor-hw Retrieved on Mar. 12, 2019.

Vogelsteller, F, and Buterin, V. 'ERC-20 Token Standard'. EIP 20. Nov. 19, 2015. Ethereum Foundation Github. Retrieved from the Internet. https://github.com/ethereum/EIPs/blob/master/EIPS/eip-20.md Retrieved on Mar. 10, 2019.

Ethereum Foundation. 'Create your own Crypto-Currency'. 2018. pp. 1-6. Retrieved from the Internet. https://www.ethereum.org/token Retrieved on Mar. 10, 2019.

Waveshare Intenational Limited. 'CORE405R Product Description'. Retrieved from the internet. https://www.waveshare.com/core405r.htm Retrieved on Mar. 10, 2019.

Gifford, C. 'License Procedure R1'. Addendum to the Time Tailor 3500 User Manual. Jan. 5, 2016. Prime Image, Inc. Santa Maria, California, USA.

\* cited by examiner

Interactions between Entities with Associated Wallets

Cryptocurrency Flow Between Wallets of a Blockchain Ecosystem

State Machine for Leased Item

Autonomous Processing (AP) Flowchart for Item Usage

Logic Design of AP Interface for Video Equipment or other Hardware Device

1.) Company (representing artist, author, producer, studio, etc.) registers domain for itself:

company1.eth

2.) Company registers sub-domains addressing individual copyrighted files or other forms of digital media such as blu-ray disk.

media1.company1.eth, media2.company1.eth, etc.

3.) Company utilizes a custom resolver for establishing a hierarchy for Distributors as well as the media the Distributors have rights to distribute:

company1.eth/distributor1, company1.eth/distributor2, etc.
media1.company1.eth/distributor1

4.) Distributor obtains Capital Pool for each media file it has rights to distribute and transfers individual amounts to:

media1.company1.eth/distributor1/pool, media2.company1.eth/distributor1/poc

5.) Distributor establishes hierarchy for registering each media player associated with a Consumer of media (Lessee)

company1.eth/distributor1/player1, company1.eth/distributor1/player2, etc.

6.) When Consumer agrees to lease (or rent) specific media from Distributor then Player entry is created under the media hierarchy (Item)

media1.company1.eth/distributor1/player1/surplus
media1.company1.eth/distributor1/player1/accumulated -usage 7.) Player IC account is loaded with specific amount from Distributor pool media1.company1.eth/distributor1/pool --> AP-IC 8.) Only the Player itself is allowed to transact with the address of line 6, once the Player has been Activated for specific media. As usage occurs the Player maintains its internal balances for Surplus and Usage AP - Surplus
AP - Usage 9.) When lease is terminated or, alternatively, AP - Surplus is low and it is time to be replenished, then Player executes Return or Warn function, transferring Surplus and Usage values to the registry.

AP-Surplus --> media1.company1.eth/distributor1/player1/surplus
AP-Usage --> media1.company1.eth/distributor1/player1/accumulated -usage
AP-IC --> media1.company1.eth/distributor1/pool Fig. 6
Distribution Model for Digital Media under Lease Using a Registry

METHODS AND SYSTEMS FOR GOVERNING USAGE-BASED LEASES UTILIZING BLOCKCHAIN CAPITAL

CROSS-REFERENCE TO RELATED APPLICATIONS

This application claims the benefit of U.S. Provisional Application Ser. No. 62/624,137, filed on Jan. 31, 2018.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

BACKGROUND OF THE INVENTION

The Background section of U.S. Pat. No. 9,818,092 describes how financial transactions, involving blockchain currencies and cryptocurrencies, may be executed and recorded on distributed blockchain ledgers utilizing computer servers connected via a network. It also describes the existence of exchanges that allow cryptocurrency to be bought and sold in exchange for fiat currency (such as U.S. dollars, Euros, etc.), and also describes wallet software executable on a personal computer, on a mobile communication device, or via use of a web application, allowing users to execute cryptocurrency transactions with some degree of security. It further describes the use of cryptocurrency public addresses that typically correspond to blockchain ledger account wallets for cryptocurrency storage and blockchain transaction destinations.

Detailed opensource hardware and software designs exist allowing one skilled in the art to utilize readily available microprocessors, flash and RAM memories, and other hardware components, in implementing a hardware-based, relatively secure blockchain wallet device that may be interfaced with a PC or mobile device via the internet in order to utilize a wallet address from which cryptocurrency may be transacted, including Ethereum-based ERC-20 cryptocurrencies. An opensource software development library and application program interface (API) exists allowing one skilled in the art to run the device as a functional web-based wallet that may be interfaced with customized executable software running website, mobile device, or PC applications for sending and receiving cryptocurrencies. Hardware development platforms also exist, with associated software-development tools, for enhancing these hardware and software cryptocurrency wallet designs with additional custom firmware processing and hardware logic design.

The Ethereum Foundation website provides detailed step-by-step instructions for one skilled in the art to create and distribute one's own Ethereum-based cryptocurrency token that may be used for private or public exchange with other crypto or fiat currencies. The aforementioned customizable wallet device also includes capabilities for one to add one's custom ERC-20 token to its list of supported tokens.

As security of blockchain transactions is an ongoing concern, blockchain innovation has been focused on improvements in the underlying implementation of blockchain transactional systems rather than innovation that solves complex contractual needs utilizing transactional capabilities.

Traditional lease, rental, or license agreements typically specify a fixed term where a payment, or periodic payments, cover usage of an item under contract during the length of time, or time periods, specified by the contract of the agreement. In the case of a vehicle rental, usage of the vehicle may be measured by taking odometer readings at the start and end of the contract period and terms of the contract may specify a charge for the distance driven, in addition to the number of days a vehicle is rented. In the case of video content streaming, a certain number of gigabytes of content capacity may be streamed per month by a streaming service to end users who may be allowed a limited time period or number of viewings through a digital media player.

Typically there are 4 entities involved in a leasing or rental business: the owner who creates or acquires items to be leased; a lessor (that may also be the owner) who profits from control of the items to be leased and establishes contracts with lessees; a lessee who utilizes an item under contract with lessor, including ongoing payments or obligations to lessor for usage; and the leased Item itself where a fair and impartial measurement of usage may be employed.

In the feature film, video production, or other "feast or famine" type industries (where market conditions are often volatile or unpredictable) there often exist situations where simple ownership, or traditional lease type arrangements have limitations. For example, a feature film production project may provide funding for a number of video processing units required for said production. A service provider may then purchase video processing units at full cost, fully utilizing all of the equipment during the course of the project, but then have a surplus of equipment after the end of the project which she may then try to rent out, sell as used equipment, or simply hold for the next big project. The manufacturer who financed creation of the equipment may find that there is lost opportunity to profit from continuing projects once the customer base has been saturated from sales of equipment; however, the service providing customer may prefer to maintain ownership or possession of the equipment indefinitely, depending on future market conditions and equipment availability.

U.S. Patent Application No. 20180089256, "Management of Entitlements Using Blockchain," does not contemplate the use of fungible blockchain currency as a quantifiable asset, therefore, all embodiments described therein would serve little purpose as a means for trade within a blockchain network. Moreover, transactions described in this patent application do not involve the exchange of blockchain currency, nor is there any contemplation or mechanism described for trading of entitlements on an exchange or assigning a valuation to an entitlement smart contract. The patent application specifically states in paragraph [0043] (paraphrasing) that smart contracts, as used therein, are used for purposes more generalized than those for a cryptocurrency such as BITCOIN, and are limited to actions performed on the entitlement itself; thus, it teaches away from any usage related particularly to blockchain currency exchange.

U.S. Patent Application No. 20110213691, "Systems and Methods for Cloud-based Brokerage Exchange of Software Entitlements," does not contemplate the usage of any form of blockchain ledger, cryptocurrency or virtual currency representing assets, outside of a traditional fiat currency-based exchange. There is no smart contract or other processing associated with the assets themselves, thus the embodiments described therein are limited to processing within the described entitlement database and brokerage engine. Control and management of the cloud-based methods and systems described in said embodiments are presumably handled by a centralized entity or entities, teaching away from the many advantages often cited for decentralized, redundant blockchain ledgers, cryptocurrencies and/or related smart contracts.

U.S. Patent Application No. 20130238496, "System and Method for Domain Leasing, Acquisition, and Development Incorporating a Virtual Currency Platform," only describes a means for managing lease, ownership or service transactions using a virtual currency, without broadening the utility of the embodiments described to include the advantages inherent in blockchain ledger technologies or blockchain currency transactions. Also, as the Abstract of the patent application clearly states, transactions using virtual money defined within the embodiments of the patent application could be considered "like kind" exchanges, tending to teach away from the advantages of speculative pricing or valuation based on future value that is possible with cryptocurrency security tokens.

Much of prior innovation has focused on the management or exchange of entitlements and leasing contracts without broadening the utility of fungible financial instruments that would otherwise solve problems (mentioned previously) that occur in potentially volatile or fluctuating markets.

Also, blockchain ledger technologies, by placing the agency of trust in a cryptographically verifiable system, eliminate the need for trust in any single person or institution; thus, blockchain provides a means for a so-called "trustless" digital ledger that may be further enhanced by automated transactional operations.

BRIEF SUMMARY OF THE INVENTION

Embodiments of the present invention provide an ecosystem where the market sensitivity of the pricing of blockchain cryptocurrency assets, exchangeable with fiat currencies, allow complex methods and systems of blockchain transactions to provide a means for manufacturers, producers or owners of items (where said items are to be leased, rented, licensed or otherwise provided to users of said items) to control the supply of total usage of said items, as well as profit from the ongoing buying and selling of cryptocurrency under varying market conditions for said items. Embodiments described herein allow providers of said items to also dynamically increase or decrease their capital investment in items based on varying market conditions, without physically or contractually altering their possession of said items other than through the buying or selling of blockchain currency. Embodiments described herein allow item owners to enjoy ongoing profits from varying market conditions; while item providers may adjust their capital risk of market exposure during variable periods of high or low demand for the items.

For purposes of describing embodiments of the present invention, the term "lease" will be used generally to cover any lease, rental, licensing, or other agreement where one party is granted limited or indefinite rights in usage or consumption of items by another party.

Embodiments of the present invention relate to a method or process enabling usage lease transactions to occur within a distributed blockchain currency ecosystem utilizing smart contracts and blockchain currencies. For embodiments of the present invention, transaction types include, but are not limited to: Activation, Refund and Return. Entities that are parties to these transactions include Lessor, or provider, of the leased item; Lessee or (contracted) user of the leased item; and the leased Item itself. The leased Item autonomously participates in the flow of blockchain currency. Digital wallet accounts are associated with each party, storing blockchain currency balances.

An alternate embodiment would be the same as that described above with the addition of a Company as a party to Supply transactions, where said Company first Supplies the Lessor with the Item.

Still another embodiment includes a device as a means for consuming an item (I.e. in the case where an item is digitized media and the device is a digital media player), where a blockchain currency wallet account is associated with the device rather then the Item itself, and the device is a party to the Activation, Refund and Return transactions. A variant of this embodiment involves the device also being a party to Supply transactions.

Embodiments of the present invention provide for distribution of blockchain currency to a Lessor, the balance of said currency dictating the total volume of simultaneous usage allowed by all Lessees, under contract with said Lessor, for lease of items governed by specific blockchain currencies.

BRIEF DESCRIPTION OF THE DRAWINGS

The present invention may be better understood by way of example, not by way of limitation, and its features and advantages made apparent to those skilled in the art by referencing the accompanying drawings. For ease of understanding and simplicity, common numbering of elements within the illustrations is employed where an element is the same in different drawings.

FIG. 6 is an example of a registry and distribution model for digital media, in accordance with embodiments of the present invention.

DETAILED DESCRIPTION OF THE INVENTION

Figure 1:
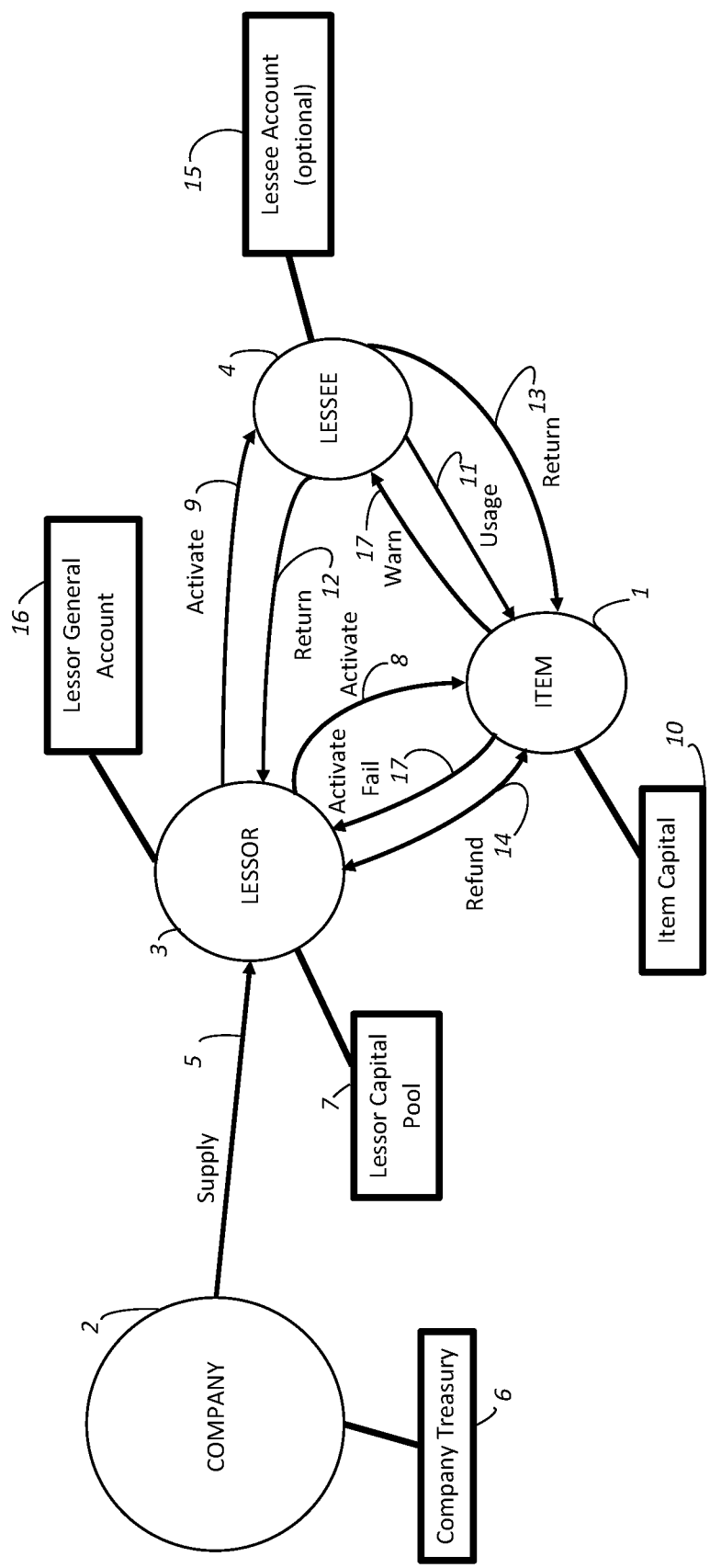
FIG. 1 is an overview of the interactions between entities concerning a leased Item, as well as the entities' associated digital wallet accounts, in accordance with embodiments of the present invention.

The following is a detailed description of embodiments of the present invention. As these embodiments of the present invention are described with reference to the aforementioned drawings, various modifications or adaptations of the methods, processes, or apparatus described may become apparent to those skilled in the art. All such modifications, adaptations, or variations that rely upon the teachings of the present invention, and through which these teachings have advanced the art, are considered to be within the spirit and scope of the present invention. For example, the cryptocurrency set forth herein has been characterized as an ERC-20 standard (Etherium-based) cryptocurrency, but it is also apparent that the transactional processes, algorithms and apparatus may be adapted to other cryptocurrencies and/or wallet technologies, presently existing or developed in the future, that offer similar capabilities. Also, certain embodiments of the present invention may be applied to blockchain technologies involving transactions that have no extrinsic value exchangeable with fiat currencies or other cryptocurrencies. Hence, these descriptions and drawings are not to be considered in a limiting sense as it is understood that the present invention is in no way limited to the embodiments illustrated.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicant hereby gives notice that new Claims may be formulated to such features and/or combinations of such features during the prosecution of the present application or of any further application derived therefrom.

References to "one embodiment," "an embodiment," "example embodiment," "various embodiments," "preferred embodiment," etc., may indicate that the embodiment(s) of the invention so described may include a particular feature, structure, or characteristic, but not every embodiment necessarily includes the particular feature, structure or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture or creation of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The term "lease" as used in this description (in all of its different forms) is intended to encompass not only a lease in a strict legal sense, but also any contract, agreement, or arrangement that governs the temporary or indefinite use of an item in exchange for some form of compensation, including, for example, a license. Additionally, the term "item" as used in this description (e.g. a leased item) can be a physical (hardware) device, a physical object or location containing a hardware device, a software program, a combination of hardware and software, or a combination of software and data. For example, an "item" can be a piece of physical video equipment, or a combination of a software media player in association with a particular media file. Note also that the term "software" as used in this description is also intended to encompass firmware (I.e., logic and/or instructions stored in non-volatile memory).

The term "lessor" as used in this description (in all of its different forms) is intended to encompass any entity acting as a provider or providing entity of a leased item, without necessarily being the owner of said item or acting as an agent of the owner. The term "lessee" as used in this description (in all of its different forms) is intended to identify the user of a leased item, being provided the item under lease.

The terms "blockchain currency" and "blockchain currency tokens" as used in this description (in all of its different forms) encompass blockchain ledgers of fungible transactions involving fiat currencies or cryptocurrencies, or fungible cryptocurrency tokens. The term "wallet" as used in this description (in all of its different forms) encompasses cryptocurrency wallets as well as blockchain ledger accounts for fiat currencies or cryptocurrencies.

The term "investor" as used in this description (in all of its different forms) is intended to encompass any entity that acquires and holds cryptocurrency tokens, later selling said tokens with a resultant return on investment, be it a gain, loss, or no gain or loss. Note that various entities may acquire blockchain tokens for a multitude of reasons within embodiments of the present invention. For example, a Lessor may purchase cryptocurrency for the primary purpose of leasing items to Lessees, receiving revenue from lease contracts independently while holding said tokens. Said Lessor may also, in effect, act as an investor if said cryptocurrency is later sold for a net return on the initial purchase price, be it positive, negative, or zero.

The terms "capital" and "capital pool" as used in this description (in all of its different forms) refers to an amount of blockchain currency representing a potential amount of usage of items, or alternatively a length of time of usage of items, or alternatively a simple limited number of items to be leased simultaneously. For example, a video equipment Lessor may possess 9.00 tokens of a particular cryptocurrency that may be distributed to video equipment units under lease allowing for 3 hours of maximum simultaneous video processing usage by Lessees at a predetermined rate of 1.50 cryptocurrency tokens per hour of video processing time. Alternatively, video equipment may be configured in such a way as to allow usage per day of rental time, at a rate of 1.50 tokens per day of rental, including an indefinite amount of video processing time during the rental period. A third alternative would be to allow for a fixed number, in this case 3, of video equipment units to be utilized simultaneously at a rate of 1.50 tokens per video unit, for an indefinite period of time of usage under lease and an indefinite amount of video processing time. In all cases, the amount of blockchain capital, or amount of blockchain currency in the capital pool, controlled by a Lessor, limits the total simultaneous usage of items (in some predetermined form of usage) that may be leased out by said Lessor, for embodiments described herein.

The term "Distributor" as used in this description is interchangeable with "Lessor" and may be used in embodiments of the present invention and description where items may be replicated for consumption by Lessees, such as may be the case with digital media content files and streams. Creators of such content are identified as "Producers" rather than "Manufacturers," in this description. "Distributor" is, however, assumed to be distinguishable and separate from the terms "Token Distribution" or "Token Distribution Event" which otherwise refer to the initial minting and distribution of cryptocurrency tokens, within this description and as understood by those skilled in the art. All forms of items, be they hardware-based items or digital media, may be said (in the present description) to be "distributed" or "supplied" to Lessors or Distributors by a Company, where "Company" is defined below.

The terms "Company" or "supplier" as used in this description refer to an owner of items, manufacturer of items, producer of items, or other agent of a creator or owner of items, specifically supplying items to Lessors or Distributors. While Lessors, Lessees and other entities may also represent various "companies," the capitalized term "Company" as used and referenced in the drawings will be limited to this specific definition.

DETAILED DESCRIPTION OF DRAWINGS

FIG. 1 is an overview of the entities (shown as circles) that interact within embodiments of the invention described herein, together with potential interactions. Note that Item 1, representing the object of the lease, is illustrated as a separate party to these interactions, and at least one interaction is performed autonomously by a digital process associated with Item 1. Transactions involving blockchain currency are illustrated in later drawings, and may be part of the interactions illustrated in FIG. 1. Digital wallets (6, 7, 10, 15 and 16) associated with the entities represent secure blockchain currency accounts and are illustrated as rectangles with arrowless lines connected to their controlling entities. Lease-related interactions between entities are shown as lines with arrows.

In FIG. 1, Company 2 provides Lessor 3 with rights, terms, and capabilities to lease out usage of Item 1 via Supply interaction 5. In practice, multiple items may be "supplied" as part of an agreement between Company 2 and Lessor 3, but for simplicity this drawing only shows interactions involving one Item 1. Company 2 also controls a Company Treasury wallet 6 which stores blockchain currency that originates from and may be transferred back to Company 2. Currency flow between wallets will be illustrated and described in later drawings.

Lessor 3 controls a Lessor Capital Pool wallet 7 that maintains a blockchain currency balance allowing Lessor 3 to conduct lease transactions within the scope of embodiments of the present invention. Once Lessor 3 has been Supplied 5, it may then conduct transactions pertaining to leasing Item 1 to Lessee 4.

Once Lessor 3 is prepared to initiate a lease of Item 1 with Lessee 4, it performs Activate interaction 8 that first prepares Item 1 for usage by Lessee 4, and then transfers control of Item 1 to Lessee 4 via Activate interaction 9. Digital processing associated with Item 1 controls access to Item Capital wallet 10 that receives and locks a portion of blockchain currency originating from Lessor 3. Conceptually, Lessor Capital Pool account 7 represents the total blockchain currency amount allocated to Lessor 3 in order to effectuate simultaneous leases of multiple items by transferring blockchain currency amounts from Lessor Capital Pool 7 to Item Capital 10 for each item under lease. In practice, Lessor 3 may choose to leave a balance in an Item Capital account 10 across multiple lease periods, performing transaction to add or deduct amounts to the account 10 balance as needs dictate.

If Item Capital 10 balance is insufficient when Lessor 3 attempts to Activate 8 Item 1 for lease, or digital processing associated with Item 1 is unable to retrieve the balance of Item Capital 10, then Activate Fail interaction 17 occurs and the lease of Item 1 is postponed until the next successful Activate 8 attempt. If Activate interaction 8 is successful, then Lessor 3 will not be able to access Item Capital 10 while Item 1 is "activated" over the course of the lease, as will be further described in later drawings.

Usage interaction 11 represents the signaling of usage of Item 1 by Lessee 4 over the course of the lease enabling a digital process associated with Item 1 to monitor or accumulate usage data, as will be illustrated in later drawings illustrating embodiments of the present invention. The Item Capital wallet 10 balance determines the maximum degree of usage by Lessee 4 and neither Lessor 3 nor Lessee 4 have the capability to alter usage data while Item 1 is active. Illustrated embodiments of the present invention provide a means for warning Lessee 4 when usage of Item 1 is approaching a maximum allowable usage limit while under lease, via Warn interaction 17. Other embodiments may not define levels of usage of item 1 in such a way where Warn interaction 17 would be employable.

Once conditions exist to end the lease period (duration of the lease comes to an end or Lessee 4 is ready to release control of Item 1, etc.) then Lessee 4 initiates a Return interaction 12 yielding control of Item 1 back to Lessor 3. Within certain embodiments, Return interaction 13 may also signal the end of accumulation of usage data for Item 1 and prepare a Refund interaction 14 that allows Lessor 3 to review usage data of Item 1 over the course of the lease, and also allow Lessor 3 to access Item Capital account 10 in order to conduct transactions with account 10, if so desired.

Usage data may allow Lessor 3 to bill the appropriate amount to Lessee 4 who may pay by any means allowed under the terms and conditions of the lease, including blockchain currency amounts in its own optional Lessee Account wallet 15. Lessor 3 also maintains a Lessor General Account wallet 16 that may be used for receiving blockchain currency payments from Lessee Account 15 as well as other transactions possible within the blockchain ecosystem of FIG. 2. Lessee Account wallet 15 and Lessor General Account wallet 16 illustrate additional utility of blockchain currency as used in the blockchain currency ecosystem of embodiments illustrated in these drawings, but may not be elemental to claims for those embodiments.

An alternative embodiment may involve a situation where Company 2 and Lessor 3 of FIG. 1 are the same entity, in other words, Company 2 is leasing it's own Item 1. In that case there would be no Supply interaction 5 (unless there is a division within the Company that operates the same as if it were an external Lessor 3 entity) and the Company/Lessor combined entity would then control wallet accounts 6, 7 and 16, where the distinction between these accounts may be more conceptual than practical. Also, the utility of said alternative embodiment would only be sensible if Company 2 were also competing with, under some agreement or arrangement, other Lessor(s) 3 utilizing Company 2's Item(s) 1. For example, suppose Lessor(s) 3 agree to invest in the manufacture of Company 2's Item(s) 1 by purchasing a custom cryptocurrency from Company 2 (called "Crypto") that only Company 2 can distribute. The amounts of Crypto purchased determine the volume of leasing possible by Lessors, and Company 2 agrees to terms allocating'/; a limited amount of crypto available to its own Lessor Capital Pool 7 for its own leasing purposes. This provides something of a level playing field between Company 2 and its Lessor 3 clients who may compete for leasing opportunities, while blockchain transactions create a "paper trail" for auditing purposes that all parties may access and keep each other in check under their mutual agreement.

Figure 2:
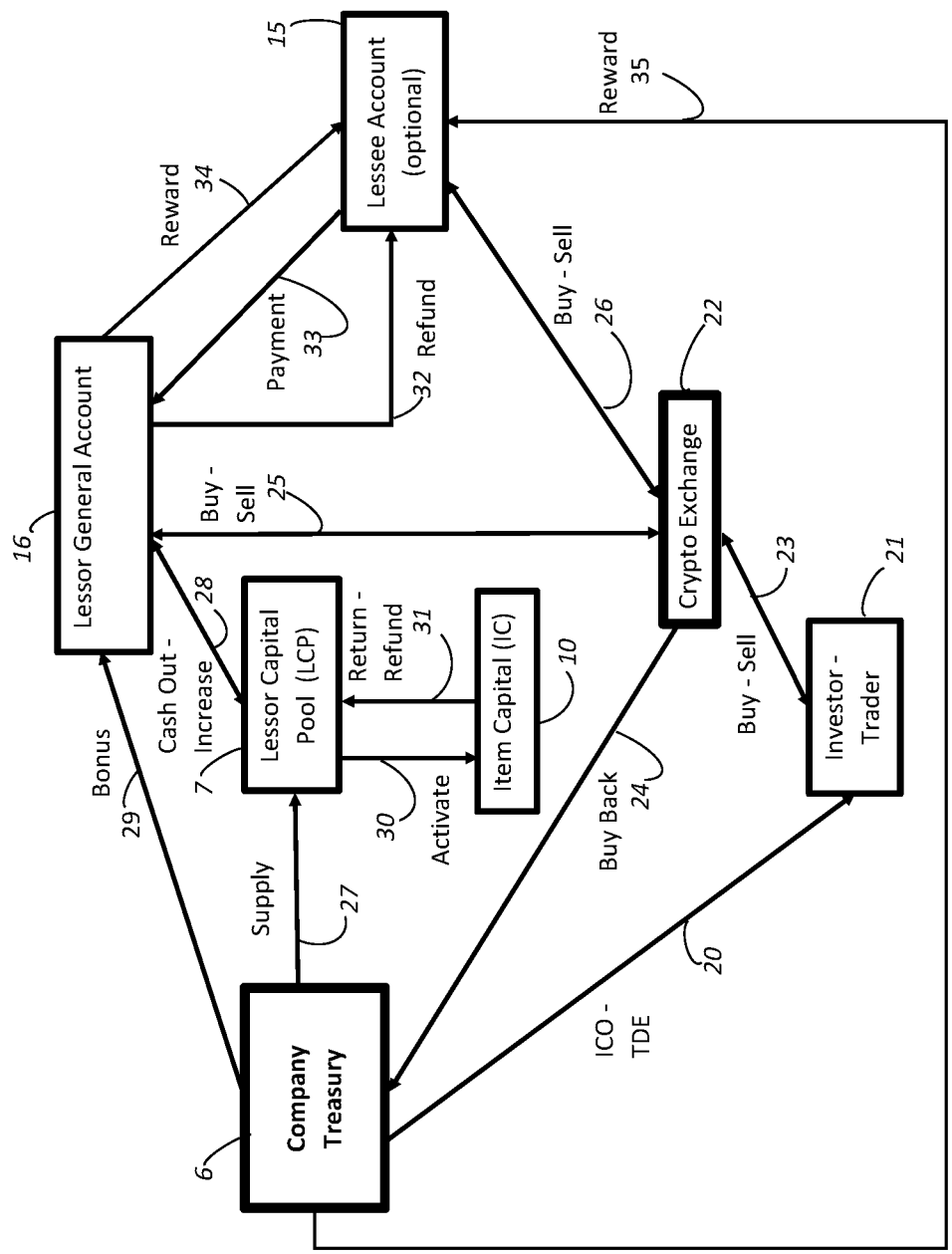
FIG. 2 is a block diagram showing blockchain currency flow between digital wallet accounts within a blockchain ecosystem, in accordance with embodiments of the present invention.

FIG. 2 shows blockchain currency transactional flow between wallets of FIG. 1 composing a blockchain currency ecosystem for the present invention. Several transactional relationships are illustrated, including those related to interactions illustrated in FIG. 1, and may be elemental to embodiments of the present invention. Single wallets are illustrated for purposes of functional simplicity, however, a real-world ecosystem would likely consist of many different accounts associated with a multitude of wallets and one skilled in the art could apply the teachings of embodiments of the present invention to such a real-world ecosystem.

For the purposes of illustrated embodiments, blockchain currency may hereinafter be referred to as "cryptocurrency" or "tokens", and the means for exchanging tokens with other currencies, or exchange between various types of tokens, may be referred to as a "Crypto Exchange". Illustrated embodiments may have the Company Treasury 6 supplying a unique, fungible cryptocurrency for use within the illustrated ecosystem, and Crypto Exchange 22 providing a means for exchange of tokens with other currencies, fiat or crypto-based, utilizing existing technologies known to those skilled in the art.

For purposes of illustrating embodiments of the present invention, a specific type of cryptocurrency may be described, such as ERC-20 (Ethereum) based security tokens; however, it should be appreciated that teachings of illustrated embodiments may be applied to other fungible blockchain currencies or ledger account implementations existing presently or in the future, on both public or private networks.

Company Treasury 6 may issue tokens through an Initial Coin Offering (ICO) or through single or multiple Token Distribution Event(s) (TDE) 20 to Investors controlling Investor/Trader wallet 21. Investors or Traders via wallet 21, in turn, may Sell (or Buy) Tokens 23 on Crypto Exchange 22. While the activity of investors or traders buying and selling tokens may not be elemental to some embodiments of the present invention, it does demonstrate an advantage of the illustrated ecosystem as a whole where a liquid market enables Company Treasury 6 to Buy Back tokens 24 when it desires to reduce the float and control supply of tokens in varying markets. It also enables a Lessor 3 of FIG. 1 to Buy or Sell tokens 25 in order to Increase or Decrease 28 the amount of their Lessor Capital Pool 7, and to exchange cryptocurrency capital for cash that may be needed for other business purposes in slow markets.

FIG. 2 shows how Company Treasury 6 may provide tokens to Lessor Capital Pool 7 in Supply transaction 27 which represents a transfer of token capital when lease rights in Item 1 are Supplied via interaction 5 to Lessor 3 in FIG. 1, under agreement between Company 2 and Lessor 3. Note that Supply transaction 27 of FIG. 2 represents the flow of tokens between specific wallets, whereas Supply interaction 5 of FIG. 1 represents the transfer of control involving Item 1 between respective entities.

Lessor 3 of FIG. 1 also controls a Lessor General Account wallet 16 that enables a number of types of transactions between Lessor 3 and Company Treasury 6, Lessor Capital Pool 7, Crypto Exchange 22, and optional Lessee Account 15 shown in FIG. 2. Lessor 3 may Cash Out a portion of, or Increase, (via transaction 28) the balance of the account of Lessor Capital Pool 7 by transferring tokens between Lessor General Account 16 and Lessor Capital Pool 7. This has the effect of reducing or increasing the Lessor Capital Pool 7 balance that may be available for future leases. For example, if demand for leases is low, Lessor 3 may desire to Cash Out via 28 part of its Lessor Capital Pool 7 in order to utilize currency for other business purposes. Lessor may then Sell tokens via transaction flow 25 to Crypto Exchange 22 in order to utilize additional fiat or other currencies for business use. Alternatively, Lessor 3 may fund or increase Lessor Capital Pool 7 by buying additional tokens via transaction flow 25 and transferring to Lessor Capital Pool 7 via transaction flow 28. Lessor 3 may also receive Bonus tokens from Company 2 via transaction flow 29 according to any agreement terms or incentives.

Activate transaction 30 of FIG. 2 must occur at some point in order to provide a positive balance in Item Capital wallet 10 in order to enable a successful Activate interaction 8 for leasing Item 1 of FIG. 1. During an active lease of Item 1, a portion of Lessor 3's Lessor Capital Pool 7 is essentially locked. At the end of a lease period, cryptocurrency may be transferred back to Lessor Capital Pool 7 via Return-Refund transaction 31, although this transaction may be considered to be more conceptual than practical since Lessor 3 does have control over Item Capital wallet 10 at any time that leasing of Item 1 is inactive.

It should be noted that Lessee Account 15 related transactions 26, 32, 33, 34, and 35 may not be elemental to claimed embodiments of the present invention, thus making Lessee Account 15 an optional token wallet account; however, such transactions illustrate additional advantages of the utility of an overall cryptocurrency ecosystem. Use of Tokens by Lessee 4 may be incentivized by Lessee Account 15 receiving Reward tokens 34 from Lessor 3 or Reward 35 from Company 2. Lessee Account 15 Tokens may in turn be Bought or Sold 26 in exchange for fiat or other currencies on Crypto Exchange 22 or used as Payment 33 for lease-related billings. Alternatively, lease agreements between Lessor 3 and Lessee 4 may include transactions involving fiat currency, other cryptocurrencies, or simply a non currency-based agreement, where all such transactions and agreements are not elemental to illustrated embodiments.

Figure 3:
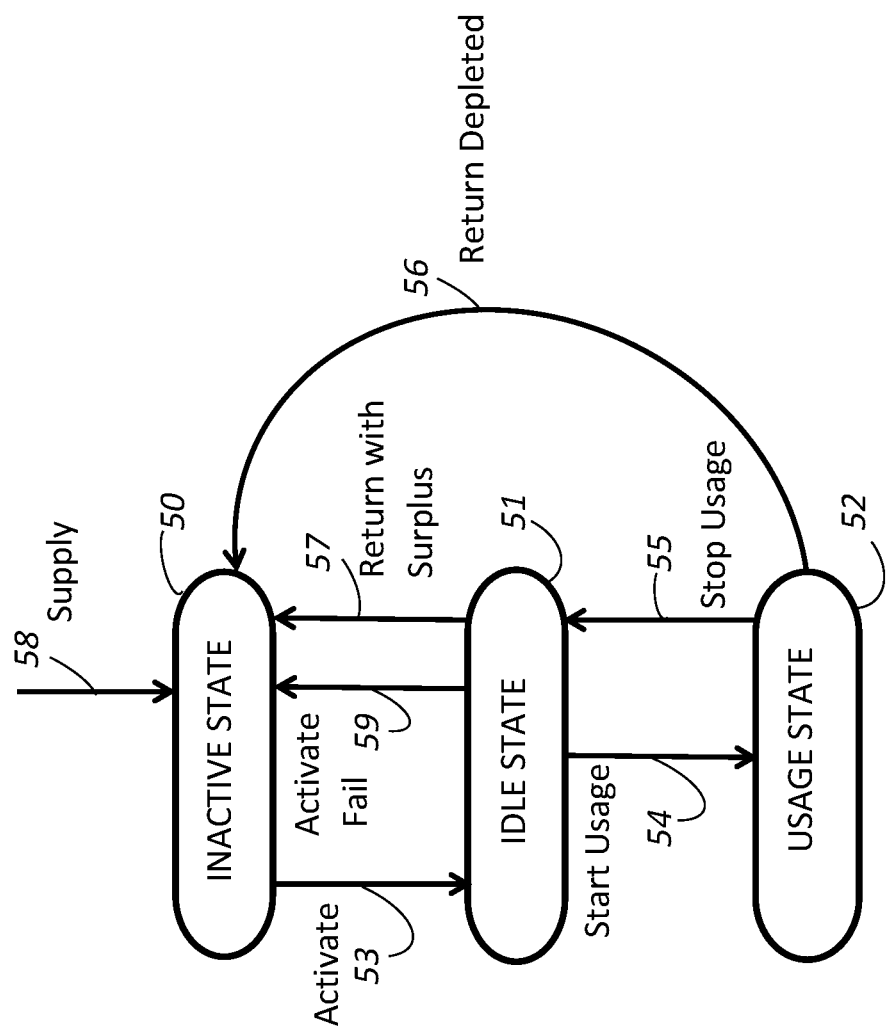
FIG. 3 is a state machine illustrating transitions between states of processing associated with a leased item, in accordance with embodiments of the present invention.
Figure 4:
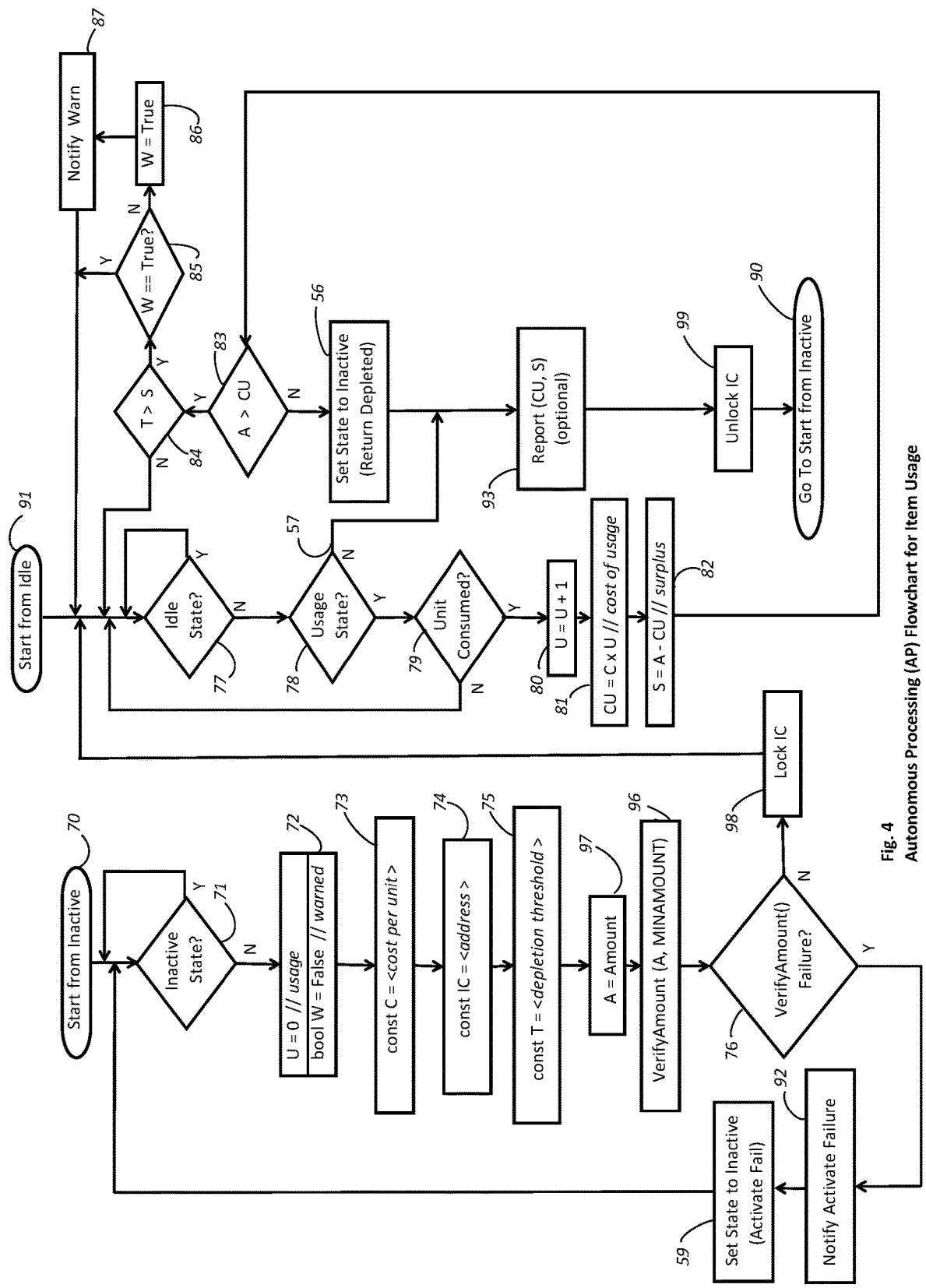
FIG. 4 is a flowchart of the processing associated with a leased Item while it is under lease, in accordance with embodiments of the present invention.

FIG. 3 illustrates a state machine for leasing Item 1 of FIG. 1 providing more detail about how the interactions illustrated in FIG. 1 effect processing states associated with Item 1. The illustrated states 50, 51, and 52 will be necessary for describing the flowchart illustrated in FIG. 4 representing processing executed via a processor and memory associated with Item 1. The terms "active," "active state," "activated," or "activation" in relation to Item 1 (as used in this description and claimed embodiments herein) will refer to said processing state, represented in FIG. 3, being in either of Idle State 51 or Usage State 52, and not in Inactive State 50.

Once Item 1 leasing rights have been supplied to Lessor 3 via interaction 5 of FIG. 1, then the state of Item 1 will be initialized 58 to Inactive State 50. When Lessor 3 initiates a lease of Item 1 through Activate interaction 8, then Activate transition 53 occurs, transitioning Item 1 from Inactive state 50 to Idle state 51. If Activate transaction 30 of FIG. 2 fails to complete for any reason then Activate Fail transition 59 returns Item 1 to Inactive State 50, as previously described for interaction 17. Otherwise, processing associated with Item 1 proceeds until Refund interaction 14 of FIG. 1 is executed at the end of the lease, and Item 1 returns to the Inactive state 50.

Depending upon the nature of the lease arrangement between Lessor 3 and Lessee 4 of FIG. 1, Lessee 4 may Start Usage (transition 54 of FIG. 3) once at the beginning of the lease and Stop Usage 55 once, via Usage interaction 11. Alternatively, Lessee 4 may Start Usage 54 and Stop Usage 55 numerous times during the course of the lease period, transitioning from Idle state 51 to Usage state 52 and from Usage state 52 back to Idle state 51 each time. In some illustrated embodiments, if maximum allowable usage is achieved by Lessee 4 (as described in later drawings) then Item 1 will transition to Inactive state 50 via Return Depleted transition 56.

Lessee 4 may also terminate the lease before maximal usage has been achieved, whereby Lessee 4 effects Return interactions 12 and/or 13 in FIG. 1, resulting in Return with Surplus transition 57 of FIG. 3 causing Item 1 to transition to Inactive state 50 from Idle state 51. Later descriptions will illustrate how embodiments may allow either Lessor 3 or Lessee 4 to effect the Return with Surplus transition 57.

FIG. 4 shows a flowchart of the executable processing that occurs on a processor with memory storage associated with Item 1 of FIG. 1 as described and illustrated for embodiments of the present invention. It should be noted that said processing may operate at certain points in time (described below) without communication or connection to the network implementing the blockchain currency ecosystem and/or distributed ledger processing as illustrated in FIG. 2; however, such communication and connection are required at those times where blockchain currency transactions or verification of account balances are to be executed. Said processing together with the hardware supporting it will hereafter be identified as the "Autonomous Processor" or "AP."

The start of processing begins in the Inactive state 50 of FIG. 3 and node 70 of FIG. 4, before a lease is Activated by Interaction 8 of FIG. 1. Conditional 71 of FIG. 4 loops indefinitely until the AP has determined that Inactive state 50 has transitioned to Idle state 51, which is only possible via Activate transition 53. As Activate interaction 8 of FIG. 1 indicates, Lessor 3 performs some action to transition said state, for example, inserting and turning a key within a hardware switch associated with the AP that, in turn, causes a signal on an I/O port to change from logical 0 to logical 1, as will be illustrated for some embodiments in later drawings.

The AP may be powered off and on after Activation transition 53 and before Return transitions 56 or 57 of FIG. 3, in which case it will remain activated when powered off and back on. If the processor is powered off while in Inactive state 50 of FIG. 3, then the processor will start at node 70 of FIG. 4 when powered back on. If the processor is powered off while in Idle 51 or Usage 52 states of FIG. 3, then the processor will resume at node 91 of FIG. 4 when powered back on. Said state is stored in non-volatile memory while the AP is turned off and back on, causing the AP to resume processing at either node 70 or 91, as the case may be.

Once Activate transition 53 of FIG. 3 has occurred, node 72 of FIG. 4 executes, illustrating the initialization of Usage (U) and Warned (W) variables utilized for AP processing, where Usage variable U is an unsigned integer value initialized to 0 and Warned variable W is a boolean value initialized to 'False'.

Nodes 73, 74, and 75 illustrate constant values specified in the AP executable code that have been predetermined by Company 2, prior to Supply interaction 5 of FIG. 1, based on agreement between Company 2 and Lessor 3. These constant values are unchangeable by Lessor 3, however, if terms of said agreement are altered resulting in changes to these constant values, then Company 2 may Supply (via interaction 5) Lessor 3 with updated AP software containing altered constant values 73, 74, and/or 75, prior to any future leases under said terms.

Constant value C (Cost per unit) 73 specifies the cryptocurrency value associated with one unit of usage of Item 1, where a "unit of usage" is a predetermined incremental measure of usage, such as a mile driven for a vehicle, a frame of video consumed for a video processor or player, or a day of rental for a condominium. An example of Cost per Unit would be 1.25 ether (cryptocurrency tokens) per 30 frames of video processed or consumed, or approximately 0.04167 tokens per each frame of video. In this example, Lessor 3 would need to transfer about 150 tokens into Item Capital wallet 10 in order for Lessee 4 to be able to process or consume a maximum of 3600 video frames.

Constant value IC of node 74 is the address of the Item Capital wallet 10 of FIGS. 1 and 2. This unique cryptocurrency wallet account is associated with the AP of Item 1, and is established by Company 2 prior to Supply interaction 5. The address of the account is required to verify that a certain positive balance exists in IC wallet 10 in order to allow limited usage of Item 1 while under lease, as described below. When Lessor 3 has multiple Items 1 available for lease, or Company 2 has Supplied (via interaction 5) multiple items to Lessor(s) 3, then each activated Item 1 will have its own unique IC wallet 10 address.

Constant value T of node 75, the Depletion Threshold, is a cryptocurrency level that determines the minimum level of surplus usage remaining (defined later in this description) where Lessee 4 is given a warning that they are close to reaching the maximum level of usage allowable while under lease, for the illustrated embodiments.

Node 97 of FIG. 4 illustrates setting variable A which is the current balance of IC account 10 of FIGS. 1 and 2.

Node 96 of FIG. 4 illustrates the execution of a function VerifyAmount( ) that attempts to verify whether there is a sufficient amount of cryptocurrency A. A must be greater than MINAMOUNT, a constant value established by Company 2 in the AP firmware prior to Supply interaction 5. Activate transition 53 of FIG. 3, once successful, locks out any access to Item Capital wallet 10 in node 98 until there is a transition (56 or 57) back to Inactive State 50 resulting in the execution of Unlock IC of node 99. VerifyAmount( ) 96 functionality will run immediately following Activate transition 53 and before Lock IC 98, requiring access to the blockchain network and the ability to retrieve the current balance of IC account 10. If VerifyAmount( ) 96 fails, then conditional 76 will detect failure and Lessor 3 will be Notified of the Failure to Activate in node 92. Then, the Item 1 state, being monitored by the AP, is set back to Inactive 50 (via transition 59) and processing of the AP returns to the point following node 70. At this point Lessor 3 must ensure that a sufficient positive balance exists in IC wallet 10 that can be properly verified before a successful lease activation of Item 1 is possible.

If, alternatively, conditional 76 of FIG. 4 determines that VerifyAmount( ) 96 has not failed, then variable A has been set to a proper level of cryptocurrency amount required for activation. The AP will then loop indefinitely at conditional 77 while in Idle State 51 until there is a transition out of Idle State 51.

Start Usage 54 and Stop Usage 55 transitions of FIG. 3 occur based on Usage interaction 11 of FIG. 1, where Lessee 4, in the process of utilizing Item 1, signals the Start 54 and Stop 55 of Usage 52 of Item 1 to the AP. In FIG. 4, the conditional 77 causes the AP to loop indefinitely while the Idle State 51 exists until such time that a state transition occurs out of Idle State 51, that may be caused due to Usage interaction 11 by Lessee 4. When transitioning out of Idle State 51 conditional 78 then determines whether transition 54 occurred to Usage State 52 or not. If not, then transition to Inactive state 50 has instead occurred due to Lessee 4 effectuating Return interaction 13 resulting in Return with Surplus transition 57. Return with Surplus transition 57 may be triggered directly by Lessee 4's Return interaction 13, or after Lessee 4's Return interaction 12 and Lessor 3's subsequent Refund interaction 14 depending on the AP configuration, as will be illustrated later in this description.

When conditionals 77 and 78 of FIG. 4 determine that transition 57 to Inactive State 50 of FIG. 3 has occurred, then CU and S values (described below) may be optionally reported to Lessor 3 in node 93, as part of Refund interaction 14 of FIG. 1. Then, processing will return to Start from Inactive node 70 as indicated by node 90.

If conditional 78 of FIG. 4 otherwise determines that Usage State 52 is the current state of Item 1 then Start Usage transition 54 has occurred, or usage is continuing from such an occurrence, due to Usage interaction 11 by Lessee 4. Conditional 79 then determines if a Unit of Usage (previously defined above) has been consumed. The AP process must execute conditional 79 frequently enough so that each unit of consumption is detected incrementally. It should also be appreciated that one skilled in the art may develop a more complex implementation for unit of consumption detection, such as an interrupt-driven counter. For purposes of illustrating elements of claimed embodiments in this description, the less complex implementation is provided for simplicity of illustration.

If an additional Unit of Consumption is detected in 79 then Total Units U consumed over the course of the lease is increased by 1 as shown in 80. Cost of Usage CU is then set to Cost per Unit multiplied by total Usage as shown in 81, and Surplus S is set to IC balance A less the Cost of Usage as shown in 82. If conditional 79 determines that a Unit of Usage has not yet been consumed, then the AP returns to conditional 77 to determine whether a transition has occurred out of Usage state 52. If not, then the AP will continue looping indefinitely while in the Usage state 52 until an additional Unit of Usage has been consumed as determined in conditional 79, or a Return with Surplus transition 57 has occurred as determined by conditional 78. Later drawings will demonstrate embodiments where digital circuitry together with firmware or software enhancements provide a means for detection of Units of Consumption 79.

After determination of consumption of a unit of usage in 79 and after accumulated Usage 80 and other values have been calculated by the AP in 81 and 82 of FIG. 4, conditional 83 then determines whether the total Item Capital (wallet 10) Amount A (established in node 97) continues to be greater than accumulated Cost of Usage CU calculated in node 81. If not, then usage has exceeded or reached it's maximum allowable limit under the lease, and the state monitored by the AP must be immediately transitioned to Inactive State 50 of FIG. 3 by the AP, effecting the Return Depleted transition 56 as indicated in FIGS. 3 and 4. (Since the AP autonomously causes this state transition to occur as part of its execution, it is illustrated as node 56 in the flowchart of FIG. 4.) Otherwise, if CU as calculated in 81 has not yet reached the IC Amount A of 97, then conditional 84 determines if the Surplus S amount remaining, calculated in 82, is less than Threshold T previously established in 75. If so, then conditional 85 determines whether the Warn( ) function has been previously executed as evidenced by the value of boolean variable W, originally initialized to False in 72. If not, then Warned W is set to True in 86 and the Warn( ) function executed in 87, warning Lessee 4 that usage of Item 1 is approaching maximum allowable usage under lease, via Warn interaction 17. Processing then proceeds to conditional 77 no matter what the outcome of conditionals 84 or 85, as part of the greater loop originating with Start from Idle node 91.

Alternative embodiments of the present invention may involve AP processing where the processing illustrated in nodes 72, 73, 75, 97, 79, 80, 81, 82, 83, 84, 85, 86, 87, 56, and 93 is not required, and where processing following the 'Y' condition of conditional 78 always returns to the point following Start from Idle node 91. In said alternative embodiments, usage of Item 1 is not measured by the AP, and the AP in and of itself would allow indefinite usage while the lease is active, once the required amount of IC account 10 balance has been successfully verified in conditional 76 and becomes locked 98 by virtue of the state of Item 1 being activated. Said alternative embodiments may be useful in situations where Company 2 desires to control the absolute total number of Items 1 that may be activated under lease simultaneously, but not necessarily gauge or limit the usage of any individual Item 1.

Embodiments where Items Comprise a Hardware Device

Figure 5:
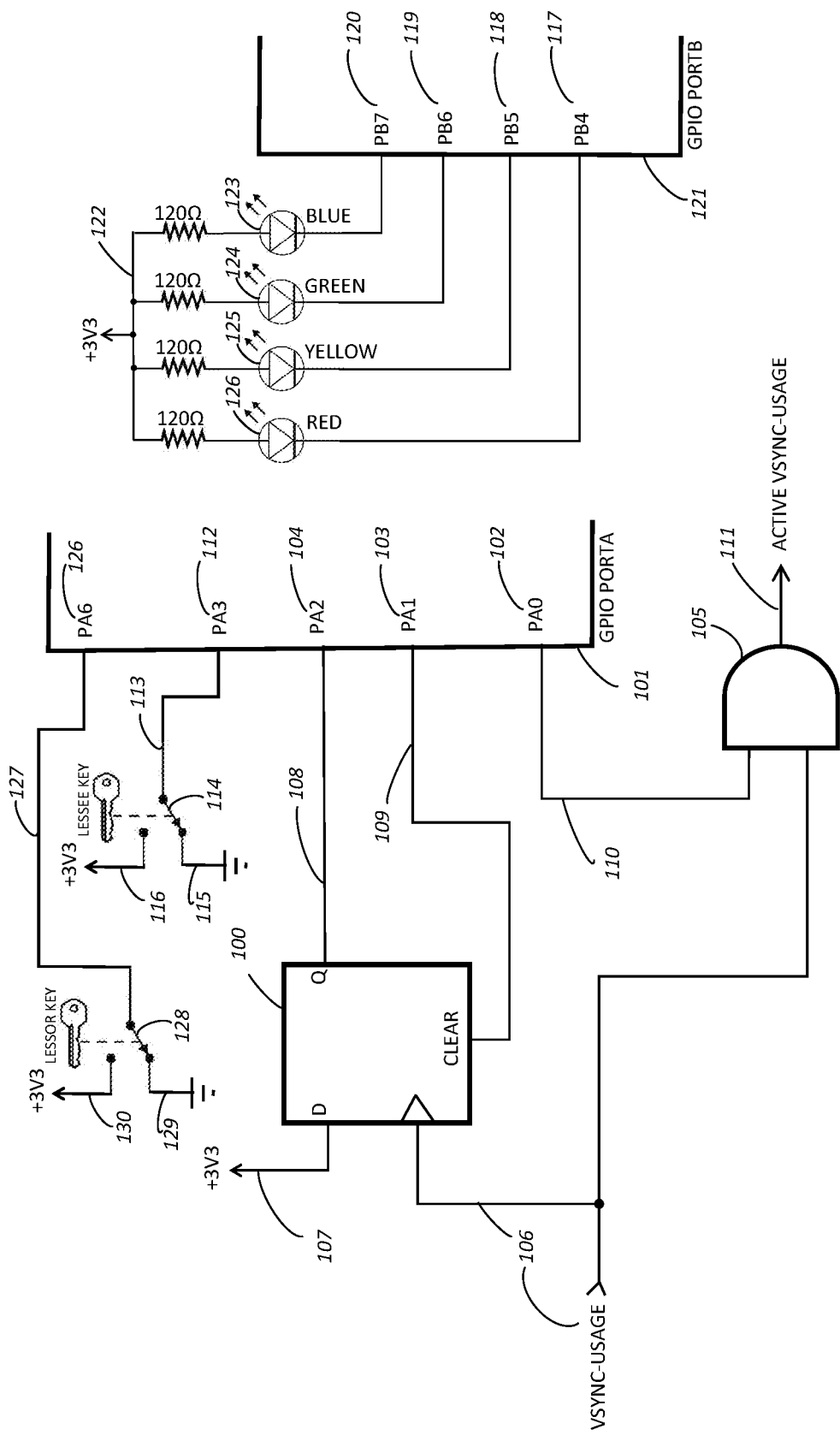
FIG. 5 is a schematic design of a logic circuit for an interface supporting processing of a leased item, in accordance with embodiments of the present invention.

FIG. 5 shows a schematic design for a digital circuit allowing one skilled in the art to create an interface supporting the interactions involving Item 1 of FIG. 1 for specific embodiments of the present invention. These embodiments include the referenced opensource hardware and firmware designs for the Trezor One hardware wallet including a STM32F205RE 32-bit RISC processor with non-volatile memory for storage of executable instructions, allowing implementation of the AP design illustrated in FIGS. 3 and 4, in addition to the Item Capital (IC) wallet 10 of FIG. 2. A referenced development platform is also available with software tools for compiling changes and additions to the Trezor One wallet firmware together with a "breadboard" for developing additional circuitry. The design illustrated and described in FIG. 5 is intended to enhance the specific referenced design of the Trezor One wallet, although it should be appreciated that the teachings of the illustrated embodiments may be applied to embodiments including and enhancing other hardware or software wallet designs utilizing other microcontrollers, microprocessors, computers, logic, memories, and/or software.

Software illustrated for AP processing illustrated at the end of this description is intended to supplement or alter the specifically referenced opensource software projects for the Trezor One wallet, allowing one skilled in the art to implement the described software enhancements composing the software portion of the AP in illustrated embodiments, together with the teachings illustrated and described for previous drawings.

The referenced Trezor One wallet design and functionality include a USB interface for connecting a computer or mobile device with internet connectivity to the wallet for performing cryptocurrency transactions and other blockchain-related interactions over the internet. Instructions for establishing connectivity and performing such transactions and interactions are described in detail in the Trezor One documentation and will not be repeated in detail here. For purposes of the embodiments illustrated in FIG. 5, it is assumed that the Trezor One wallet digital design and functionality is replicated in totality, together with the described enhancements and changes, although the actual circuitboard layout and hardware case may be altered or replaced for purposes of adaptation to the circuitboard, hardware case, and interface design associated with Item 1 of FIG. 1, where embodiments of Item 1 comprise a hardware device.

One example of a claimed embodiment would be where Item 1 of FIG. 1 comprise a piece of professional video equipment that may be rented out for use within the film and video production industries. As a boutique equipment manufacturer, Company 2 could Offer (via transaction 20 of FIG. 2) a custom ERC-20 (Ethereum-based) cryptocurrency in exchange for fiat currency, funding the manufacture of units of Item 1 in order to satisfy expected needs. In this case, equipment rental providers, Lessor(s) 3, who plan to rent out units may also act as investors funding the creation of units, where Lessor General Account 16, Lessor Capital Pool 7, and Investor account 21 may be all one and the same ERC-20 wallet, or at least wallets that are all controlled by the same Lessor 3 entity. Supply of the cryptocurrency would be controlled and only originate with Company 2. As a boutique company serving a limited market, Company Treasury 6 may also function as Crypto Exchange 22 where Company 2, itself, may profit by buying back cryptocurrency at a low price when demand for Units 1 is low, and selling cryptocurrency to Lessor 3 clients at a relatively higher price when demand for multiple Units 1 is high. The Trezor One wallet design composing Item Capital wallet 10 may be configured, using documented and referenced methods, to support Company 2's custom ERC-20 (Ethereum-based) cryptocurrency, as Item 1 is rented out. Since it is assumed that Company 2's expected clientele is limited, it would be sensible for Company 2 to implement and maintain a private Ethereum network, using known and documented techniques utilizing private servers or a private network, since there would be no need for the general public to have access to Company 2's cryptocurrency, and "gas" costs (expenses associated with utilizing Ethereum or ERC-20 transactions on a public network) would then not be an issue for Company 2.

As Company 2 of FIG. 1 performs Supply interaction 5 to Lessor 3, it provides video equipment (Item 1) containing the AP processor and firmware enhancements of FIGS. 4 and 5 together with the Trezor One-based Item Capital wallet 10. The AP firmware is also preconfigured by Company 2 with an agreed upon Cost per Unit 73 rate, for embodiments where this would be required.

Company 2 may also provide physical keys to Lessor 3 used for activating Item 1 units by either or both of Lessor 3 and Lessee 4, as indicated by switches 114 and 128 in FIG. 5. Physical key activation (fully described below) may be suitable for equipment utilized in video and film production environments, however it should be appreciated that one skilled in the art will also be capable of implementing secure digitally operated switches for the illustrated embodiment that could operate via a networked and/or wireless interface, or a digital hardware interface, performing the same switching functionality as illustrated for switches 114 and 128. Keys enabling switching of switches 114 and 128, whether they be physical, numeric, or digital, may be provided to Lessor 3 as part of Supply interaction 5.

Once Lessor 3 has established an equipment rental agreement with a Lessee 4 via Activate interaction 9, Lessor 3 must then ensure that there is sufficient cryptocurrency in IC wallet 10 in order to cover the agreed upon usage by Lessee 4, or alternatively, to cover the amount of cryptocurrency required for lease activation as agreed upon between Lessor 3 and Company 2. Lessor 3 must also ensure that the Trezor One IC wallet 10 is connected via USB to a device with internet access, and logged in so that it may sign transactions using known and documented methods. (Note that the primary advantage of utilizing a hardware wallet physically separated from the computing device with access to the internet has to do with improved security, although it may certainly be possible to implement Item Capital wallet 10 as a software or hardware wallet on the internet-enabled device processor itself, provided the functional enhancements of the AP described herein are included as well.)

Lessor 3 then attempts to Activate 8 Item 1 by using the provided Lessor Key in switch 128 of FIG. 5 to switch signal 127 from logic level '0' 129 to logic level '1' 130. GPIO Port PA6 (126), which utilizes an unused pin of PORTA (101) of the Trezor One hardware design, is configured as an input port detecting the activation signal 127. In firmware routines illustrated later in the description, this change of Port PA6 (126) from '0' to '1' effectuates Activate transition 53 of FIG. 3, causing the Item 1 usage state to transition from Inactive State 50 to Idle State 51. Depending on the outcome of VerifyAmount( ) function 96 (software implementation of which will also be illustrated later) and conditional 76 of FIG. 4, the lease of Item 1 will then remain active until terminated, or Lessor 3 will be notified of Activate Fail (interaction 17 of FIG. 1 and node 92 of FIG. 4) as state transition 59 takes effect. Lessor 3 must then resolve the problem causing VerifyAmount( ) 96 to fail, and then switch Lessor Key 128 to select the '0' signal 129 position, clearing the notification, and back to the '1' signal 130 to re-attempt activation.

Several unused GPIO port pins of GPIO PORTB (121) of the Trezor One hardware design are configured in FIG. 5 as output ports in order to turn on light emitting diodes (LEDs) 123, 124, 125, and 126 utilizing circuitry 122 when logic level '1's are present on port PB4 (117), PB5 (118), PB6 (119), and/or PB7 (120). These LEDs are utilized to provide notifications to Lessor 3 and Lessee 4 while Activating (via interactions 8 and 17), Using (via interactions 11 and 17), and Returning-Refunding (interactions 13 and 14) Item 1 over the course of a lease. It should be appreciated that one skilled in the art may implement alternative forms of notification circuitry and/or software, such as utilization of an LCD display, blockchain messaging, etc.

As will be further illustrated in software below, Red LED 126 will be lit during notification of Activation Failure 92 (being unlit and notification cleared when Lessor Key switch 128 selects signal '0' 129), Yellow LED 125 will be lit during Warn( ) notification 87 (being unlit and cleared once Item 1 state becomes Inactive State 50), Green LED 124 will be lit while the Item 1 state is active (51 or 52) and Blue LED 123 will be lit while the Item 1 state is Usage State 52. Note that Yellow LED 125 may not be employed or utilized for some hardware device embodiments of the present invention, and that Green and Blue LEDs 124 and 123 are optional features with the advantage of providing additional information during usage and also for problem solving. The Lessee Key for switch 114 may be provided to Lessee 4 (during Activate interaction 9) in order to enable transitions to Usage State 52 so that unauthorized users may be locked out of usage of Item 1. In this case, GPIO port PA3 (112) is configured as an input port where signal 113 as logic level '1' (116) selected by switch 114 enables Start Usage 54 transitions, and logic level '0' 115 detected on signal 113 immediately effectuates Stop Usage transition 55 and disables any further Start Usage 54 transitions. For other hardware device embodiments, switch 114 may alternatively be configured to enable Start Usage 54 transitions when signal 113 is logic level '1' (116) as indicated above, while selection of logic level '0' by switch 114 immediately places Item 1 in Inactive State 50 by effectuating Return with Surplus transition 57, terminating any further usage while under lease. Both software implementations for Lessee Key switch 114 described above will be further detailed in software illustrated later.

GPIO port PA1 (103) of FIG. 5 is configured as an output port where firmware routines illustrated later in the description will produce a pulse on signal 109 upon Start Usage transition 54, clearing edge-triggered D flip-flop 100 so that Q output will drive signal 108 to logic level '0'. GPIO port PA2 (104) is configured as an input port where firmware routines illustrated later will poll port PA2 (104) causing conditional 79 of FIG. 4 to detect a unit of usage consumed when signal 108 transitions to logic level '1'. Once a unit of usage consumed has been detected (79), then port PA1 (103) will produce another pulse on signal 109 clearing flip-flop 100 and taking signal 108 to logic level '0' once again. Flip-flop 100 will latch the logic level '1' input signal 107 when the rising edge of a pulse occurs on signal 106 at the clock input of flip-flop 100, causing output Q of flip-flop 100 and signal 108 to transition to logic level '1,' indicating that a unit of usage of consumption has occurred as described above.

The input signal 106, labeled VSYNC-USAGE, is produced by the hardware device comprising Item 1, or at least a hardware device that is driven by usage of Item 1. In an embodiment where Item 1 is video equipment, input signal 106 may be generated by a typical vertical sync pulse produced by such equipment, where a rising edge of a pulse on signal 106 occurs for every frame of video processed or consumed. Consequently, node 80 of FIG. 4 will be counting video frames for said embodiment. In an embodiment where Item 1 is a vehicle rental, input signal 106 may be generated as a pulse occurring for every mile or kilometer driven while the vehicle is being rented, thus node 80 would be counting units of distance driven.

Some embodiments may employ GPIO port PA0 (102) of FIG. 5 configured as an output port and producing a logic '1' on signal 110 when usage of Item 1 is allowed. This may occur after the unit has been successfully activated by Lessor 3, and Lessee 4 has enabled usage of Item 1 via keyed switch 114. If, however, maximum allowable usage has been reached and Return Depleted transition 56 of FIG. 4 is effectuated, then signal 110 may be taken to logic level '0' by port PA0 (102) as illustrated in firmware routines described later. Logical AND gate 105, taking signal 110 and VSYNC-USAGE signal 106 as inputs, produces output signal 111 labeled ACTIVE VSYNC. For video equipment, signal 111 produces a VSYNC signal for use by video equipment that becomes logic level '0' once usage is no longer allowed, effectively disabling the video equipment that otherwise requires VSYNC pulses in order to function.

Other hardware device embodiments may take signal 110 output directly, labeled ACTIVE USAGE, that may simply have some desired effect on the lease of a hardware device comprising or associated with Item 1. For instance, a vehicle rental may automatically flag a higher rate to be charged to Lessee 4 if maximum allowable distance driven under a discounted rate is exceeded.

It is also possible for some hardware device embodiments to involve usage measurements that are continuous measurements of time. Suppose that Item 1 is a condominium rental unit and the hardware device associated with it is an electronically activated lock at the entry of the rental unit. In this case, maximum allowable usage may be determined on a daily usage basis, with a specific checkout time. USAGE pulses on input signal 106 may occur every hour on the hour produced by a clock circuit, so that node 80 of FIG. 4 is counting continuous hours of usage. Suppose that maximum allowable usage is set at 73 hours, then Lessee 4 may be given a warning 87 at 72 hours of usage. At 73 hours of usage, Return Depleted transition 56 occurs, taking ACTIVE USAGE signal 110 low, activating the electronic lock at the entry. Once activated, renters may be allowed to open the door from the inside to leave, but not from the outside if they attempt to reenter the unit.

Embodiments where Item is Digitized Media with an Associated Media Player

Embodiments of the present invention may involve items where Item 1 of FIG. 1 is a proprietary digital media file or stream, such as a digitized movie being streamed, or played after being downloaded. Specifically, a Lessee 4 (in this case the consumer of the movie) may only be billed by a Lessor 3 for the amount of time actually spent watching the film, as measured by the media player device. If the consumer Returns with Surplus (57) early because they don't like the film and have decided not to watch the remainder of it, then they may be charged very little in this instance. For this use case, the State Machine operates within a means for consumption of the digital file, in this case a video player application. A downloaded instance of the player app (or alternatively a settop box) together with the specific video stream would together comprise the leased Item 1 of FIG. 1 and the AP (autonomous processor) associated with it.

Prior to the Consumer "leasing usage" of the video, the video player is in Inactive state 50 with respect to the video being rented. The video is Activated (53) when the consumer performs a transaction with the Lessor (in this case it could be an online video rental service) at which time the required Activation (53) transition takes place where the video starts out in an Idle (51) state. The consumer may then start playing the file, play back portions of the file numerous times, skip ahead over sections, etc, transitioning between Idle (51) and Usage (52) states all the while. Only the amount of video consumed, such as number of frames played, is then counted toward usage. When the consumer is finished with the video a Return with Surplus (57) transition puts the video back in Inactive state 50 and consumer is Charged Payment (33) or Refunded (32) appropriately, as indicated in FIG. 2.

A variation of the video file rental use case may involve leasing a video with an indefinite term, in other words, the consumer may view the file and keep it in their online library as long as they are paying ongoing usage bills or subscriptions. Return Depleted (56) or Return with Surplus (57) transitions may occur periodically, such as once per month, or when a file is checked back into the online library. In an online scenario, Activation (53) may occur automatically provided the consumer is current in paying their bills. Even if the consumer is only paying a flat fee for their service, the Usage transaction information is still valuable to the Lessor and/or Company in order to track popularity of certain videos, determine royalty payments, etc. It is also of value to the operation of the cryptocurrency ecosystem to be able to know how much bandwidth, storage, etc working capital must be allocated for specific media, or how this is divided up between distribution channels (Lessors). Also, and perhaps most importantly, the cryptocurrency value and circulation fluctuate according to actual product usage rather than ongoing profits from subscriptions.

The wallet containing the IC account (10) would be part of the online setup, optionally with attached hardware for additional security. The online movie distributor would be responsible for handling transactions to the IC wallet account (10), presumably per an agreement with the copyright holder or producers of the film, in order to provide activation of usage or consumption of the movie under rental.

FIG. 6 is an example of a registry of wallet accounts or registry nodes for entities in the video rental platform use case described above. It is based on existing Ethereum Name Service (ENS) protocols currently used to register .eth domains, and Interplanetary File System (IPFS) hierarchical addressing protocols, similar to URL addressing, that is known to those skilled in the art who are currently implementing details and protocols for merging these two systems, or similar protocols, outside of the scope of the present invention. The notations in the right column of FIG. 6 teach one illustrated embodiment. Although the actual syntax of the addressing scheme may not exactly match what may be adopted as a standard or practice, it should be obvious to those skilled in the art how the hierarchy and naming structure illustrated may be adapted to future schemes and protocols.

Line 1 of FIG. 6 illustrates the Company entity 2 of FIG. 1 establishing a .ETH domain that may, among other uses, resolve to an address of its Company Treasury account 6 of FIG. 1. A "Company," in this embodiment of the present invention, may represent the owner of the copyright of the media to be leased.

Line 2 illustrates the Company establishing subdomains for each of the video media Items (video episodes, films, etc) that it owns and may offer for Lease. Pricing and various usage data may be recorded and registered under each of these.

Line 3 illustrates directories established for each Distributor of media (where each Distributor is otherwise known as a Lessor in the present invention) under both the Company domain as well as the domain for the media they are allowed to Distribute. Usage data and other financial data may be broken down and registered with each of these.

Line 4 shows the directory structure for the Lessor Capital Pool account or wallet (LCP 7 of FIG. 2) for each Distributor.

For the illustrated online video rental platform, each video player software application (representing the "means of consumption" mentioned earlier) downloaded and registered by a Consumer (Lessee) is given its own directory under the Company/Distributor hierarchy in Line 5. Information about the Consumer using the video player may also be associated with this directory entry.

When a specific video file is activated by a video player then the player is given its own directory under the media/distributor hierarchy shown in Line 6. This association between the player and media together composes an Item entity 1 of FIG. 1 under the present invention, where the player is the aforementioned means of consumption of the digital file. Sub-directories are also created for Surplus (S) and accumulated cost of usage (CU) data nodes representing data transferred by the Report function executed in 93 of FIG. 4.

Line 7 illustrates a transaction where Lessor 3 transfers a certain amount of token cryptocurrency (A of node 97 in FIG. 4) to IC wallet 10 to be locked by the AP while Lessee 4 is consuming the film (Item 1).

Line 8 illustrates the processing stage where Surplus and Cost of Usage amounts may be updated in the registry by the AP process.

Line 9 illustrates the transactions and data registration of the Report function executed in 93 of FIG. 4. When a video content Item is "Returned," or checked back into a library, then its usage data is recorded here. If a particular file is checked out more than once by a specific player then data across all such leases may be recorded and accumulated here. Return/Refund transaction 31 of FIG. 2 may also return the previously locked amount from the IC account back to the Distributor LCP account.

CONCLUSIONS

Embodiments of the present invention allow Companies 2 distributing Items 1 to Lessors 3 to maintain control over levels of usage while said items are under lease. Said Companies together with investors may also profit by distributing, selling, and buying cryptocurrency correlated with said levels of usage, during periods of varying demand for said Items. Lessors 3 may adjust their capitalization for lease capacity of Item 1 usage depending on varying demand and market conditions for Items 1 by simply transacting blockchain currency. Lessees 4 may also benefit from participation within the cryptocurrency ecosystem of illustrated embodiments, illustrating additional advantages to said embodiments.

Enhancements to Trezor One Firmware Supporting AP Processing for Illustrated Embodiments Following are additions and changes to Version 1.7.3 of the Trezor One hardware wallet open source firmware project, trezor/trezor-mcu, located on GitHub at: https://github.com/trezor/trezor-mcu/

These changes and additions are all illustrated in the C programming language code of the project which may be recompiled using the tools and methods documented for the existing trezor-mcu project. While the illustrated code may not be free of minor implementation bugs or errors, the teachings illustrated are sufficient for one skilled in the art to create functional embodiments.

The enhancements to the files storage.h and storage.c illustrated below support non-volatile (flash) memory storage of the active vs. inactive state monitored by the AP, required for determining whether AP processing proceeds from Start from Inactive node 70 versus Start from Idle node 91 of FIG. 4 when the AP processor is powered off and powered back on, as previously described:

storage.h

```
// add the following after line 76 for typedef struct _Storage
    STORAGE_BOOL (ap_state)
// add the following function declarations after line 152
    void storage_setAPstate(bool ap_state);
    bool storage_getAPstate(void);
// end of changes to storage.h
``` storage.c

```
// add the following after line 359 for static void storage_commit_locked(bool update)
    If (!storageUpdate.has_ap_state) {
        storageUpdate.has_ap_state = storageRom->has_ap_state;
        storageUpdate.ap_state = storageRom->ap_state;
    }
```

-continued

```
// add the following function definitions after line 887
void storage_setAPstate(bool ap_state)
{
   If ((storageRom->ap_state == ap_state) {
      return; //no change in stored state
   storageUpdate.has_ap_state = true;
   storageUpdate.ap_state = ap_state;
   storage_update( );
}
Bool storage_getAPstate(void)
{
   Return storageRom->has_ap_state ? storageRom->ap_state : 0;
   // returns INACTIVE state 0 if AP state has not been previously stored
}
// End of changes to storage.c
```

The following additional files, ap_ports.h and ap_ports.c, support processing involving GPIO PORTA 101 and GPIO PORTB 121 of FIG. 5.

ap_ports.h

```
#ifndef _APPORTS_H__
#define _APPORTS_H__
#include <libopencem3/stm32/gpio.h>
#include <stdtool.h>
struct apPortState {
   volatile bool LessorKeyActive;
   volatile bool LesseeKeyActive;
   volatile bool UsageConsumed;
};
extern struct apPortState apPort;
uint16_t apPortRead(void);
void apPortUpdate(void);
void clearUsageConsumed(void);
void setActiveUsage(bool active);
void setFailedLED(bool failed);
void setWarnLED(bool warn);
void setActiveLED(bool active);
void setUsageLED(bool usage);
#ifndef AP_STATE_PORT
#define AP_STATE_PORT GPIOA //PORTA 101 of FIG. 5
#endif
#ifndefLED_PORT
#define LED_PORT GPIOB //PORTB 121 of FIG. 5
#endif
#ifndefLESSOR_PIN
#define LESSOR_PIN GPIO6 //PA6 126 of FIG. 5
#endif
#ifndefLESSEE_PIN
#define LESSEE_PIN GPIO3 //PA3 112 of FIG. 5
#endif
#ifndef USAGE_PIN
#define USAGE_IN GPIO2 //PA2 of FIG. 5
#endif
#ifndef CLEAR_PIN
#define CLEAR_PIN GPIO1 //PA1 of FIG. 5
#endif
#ifndef ACTIVE PIN
#define ACTIVE_PIN GPIO0 //PA0 of FIG. 5
#endif
#ifndefFAILED_PIN
#define FAILED_PIN GPIO4 //PB4 of FIG. 5
#endif
#ifndefWARN_PIN
#define WARN_PIN GPIO5 //PB5 of FIG. 5
#endif
#ifndefACTIVE_INDICATOR_PIN
#define ACTIVE_INDICATOR_PIN GPIO6 //PB6 of FIG. 5
#nedif
#ifndef USAGE_INDICATOR_PIN
#define USAGE_INDICATOR_PIN GPIO7 //PB7 of FIG. 5
#endif
#endif
// End of file ap_ports.h
``` ap ports.c

```c
#include "ap_ports.h"
struct apPortState apPort;
uint16_t apPortRead(void) {
    return gpio_port_read(AP_STATE_PORT);
}
void apPortUpdate( );
{
    Uint16_t state;
    Static uint16_t last_state = 0;
    state = apPortRead( );
    If ((state & LESSOR_PIN) == 0) {//Lessor key switch 128 set to '0' 129
        if ((last_state & LESSOR_PIN) == 0) {
            apPort.LessorKeyActive = 0;
        } else {
            apPort.LessorKeyActive = 0;
        }
    } else {// Lessor key switch 128 set to '1' 130
        if ((last_state & LESSOR_PIN) == 0) {
            apPort.LessorKeyActive = 1;
        } else {
            apPort.LessorKeyActive = 1;
        }
    }
    If ((state & LESSEE_PIN) == 0) {//Lessee key switch 114 set to '0' 115
        if ((last_state & LESSEE_PIN) == 0) {
            apPort.LesseeKeyActive = 0;
        } else {
            apPort.LesseeKeyActive = 0;
        }
    } else {// Lessor key switch 114 set to '1' 116
        if ((last_state & LESSEE_PIN) == 0) {
            apPort.LesseeKeyActive = 1;
        } else {
            apPort.LesseeKeyActive = 1;
        }
    }
    If (state & USAGE_PIN) == 0) {
        apPort.UsageConsumed = 0;
    }else {
        apPort.UsageConsumed = 1; // Unit of consumption detected 108
    }
    last_state = state;
}
void clearUsageConsumed(void) {
    // the following generates a pulse signal for flip-flop 100's CLEAR input via signal 109
    gpio_set(AP_STATE_PORT, CLEAR_PIN);
    gpio_clear(AP_STATE_PORT, CLEAR_PIN);
}
void setActiveUsage(bool active) {
    if (active) // Set ACTIVE USAGE signal 101 to value of boolean argument active
        gpio_set(AP_STATE_PORT, ACTIVE_PIN);
    else
        gpio_clear(AP_STATE_PORT, ACTIVE_PIN);
}
void setFailedLED(bool failed) {
    if (failed) // Light RED LED 126 if argument failed is true, otherwise clear it
        gpio_set(LED_PORT, FAILED_PIN);
    else
        gpio_clear(LED_PORT, FAILED_PIN);
}
void setWarnLED(bool warn) {
    if (warn) // Light YELLOW LED 125 if argument warn is true, otherwise clear it
        gpio_set(LED_PORT, WARN_PIN);
    else
        gpio_clear(LED_PORT, WARN_PIN);
}
void setActiveLED(bool active) {
    if (warn) // Light GREEN LED 124 if argument active is true, otherwise clear it
        gpio_set(LED_PORT, ACTIVE_INDICATOR_PIN);
    else
        gpio_clear(LED_PORT, ACTIVE_INDICATOR_PIN);
}
```

-continued

```
void setUsageLED(bool usage) {
   if (warn) // Light BLUE LED 123 if argument usage is true, otherwise clear it
      gpio_set(LED_PORT, USAGE_INDICATOR_PIN);
   else
      gpio_clear(LED_PORT, USAGE_INDICATOR_PIN);
}
// End of file ap_ports.c
```

The following additional files, ap.h and ap.c, support processing illustrated in the state diagram of FIG. 3 and the flowchart of FIG. 4.

ap.h

```
#ifndef _AP_H__
#define _AP_H__
#include "bignum.h" //big number types used by this project
const char* const ICADDRESS = "<address>" /* node 74 of FIG. 4 <address> is to be
               replaced with the ethereum address of the IC
               wallet 10, set by Company 2 prior to Supply interaction 5 */
extern bool apActivated; /* False during Inactive State 50, otherwise True when the AP is
               activated */
extern bool apUsage; // True during Usage State 52
extern bool apFailed; // True when conditional 76 of FIG. 4 detects VerifyAmount( ) failure
extern bool apWaitVerify; // True while waiting for VerifyAmount( ) 96
extern bignum256 apAmount; //Amount A of node 97 of FIG. 4 in units comparable to wei
void initActivate(void); // Function called when conditional 71 of FIG. 4 detects activation
void successfulActivate(void); //Function called to update NVRAM when activation successful
void failedActivate(void); // Function called when conditional 76 of FIG. 4 detects failed
               // activation
void startFromIdle(void); // Function called following Start from Idle node 91 of FIG. 4
#endif
//End of Ap.h file
``` ap.c

```
#include <gmp.h> // This file uses the GNU MP library for handling calculations of ether in
               // units comparable to wei
#include "ap_ports.h"
#include "ap.h"
#include "storage.h"
const char* const COST_PER_UNIT = "<cost per unit>" /* <cost per unit> in units comparable
               to wei (18 hex digits) is to be replaced with value 73 of
               FIG. 4, established by Company 2 prior to Supply 5
               interaction */
const char* const DEPLETION_THRESHOLD = "<depletion threshold>" /* <depletion
               threshold> is to be replaced with value 75 of FIG.
               4, established prior to Supply 5 in units comparable
               to wei (18 hex digits) */
bool apActivated;
bool apUsage = false;
bool apFailed = false;
bool apWaitVerify = false;
bignum256 apAmount;
mpz_t apUsageAmount; //U of FIG. 4
bool apWarned; //W of FIG. 4
mpz_t apSurplus; //S of FIG. 4
mpz_t apCostOfUsage; //CU of FIG. 4
mpz_t apT; //T of FIG. 4
mpz_t apA; //A of FIG. 4
mpz_t apC; //C of FIG. 4
void initActivate(void) {
    apActivated = true;
    setFailedLED(false);
    apWarned = false; // Node 72 of FIG. 4
}
void successfulActivate(void) {
    storage_setAPstate(true);
    apWaitVerify = false;
    mpz_init(apAmount); //GMP variables need initialization
    mpz_init(apUsageAmount); //automatically initialized to 0
    mpz_init(apSurplus);
    mpz_init(apCostOfUsage);
    mpz_init(apT);
    mpz_set_str(apT, DEPLETION_THRESHOLD, 16);
    mpz_init(apA);
```

```
      mpz_import(apA, 9, -1, 32, apAmount); // convert bignum256 to GMP format
      mpz_init(apC);
      mpz_set_str(apC, COST_PER_UNIT, 16);
   }
   void deActivate(void) {
      apUsage = false;
      setActiveUsage(false);
      apActivated = false; //Node 56 and 90 of FIG. 4
      setWarnLED(false); //Clear warning now that deactivated
      setActiveLED(false);
      setUsageLED(false);
      storage_setAPstate(false); // set Inactive State in NVRAM
      // Reporting of CU and S to Lessor 3 in Node 93 is optional and may be
      // achieved by sending a signed message to ICADDRESS containing a
      // text message with the respective amounts, utilizing the function
      // ethereum_message_sign(msg, node, resp) defined in the file
      // ethereum.c
      mpz_clear(apAmount); //GMP variables need to be cleared
      mpz_clear(apUsageAmount);
      mpz_clear(apSurplus);
      mpz_clear(apCostOfUsage);
      mpz_clear(apT);
      mpz_clear(apA);
   }
   void failedActivate(void) {
      apFailed = true;
      setFailedLED(true); // Node 92 of FIG. 4
      apActivated = false; // Node 59 of FIG. 4
      apWaitVerify = false;
   }
   void startFromIdle(void) {
    setActiveLED(true);
    apUsage = apPortState.LesseeKeyActive;
    /*Another mode of operation described previously would be for allowing Lessee Key
    turned to '0' to also deactivate system:
    if (!apPortState.LesseeKeyActive) apActivated = false;
    etc. */
    If (apUsage) { //Conditional 78 of FIG. 4 detecting Usage State 52
       setUsageLED(true);
       setActiveUsage(true);
       if (apPortState.UsageConsumed) { //Conditional 79 of FIG. 4 detects unit
                                        // consumed
          clearUsageConsumed( ); //clear flip-flop 100 of FIG. 5
          mpz_add_ui(apUsageAmount, apUsageAmount, 1); // Node 80 of FIG. 4
          mpz_mul(apCostOfUsage, apC, apUsageAmount); // Node 81 of FIG. 4
          mpz_sub(apSurplus, apAmount, apCostOfUsage); // Node 82 of FIG. 4
          If (mpz_cmp(apA, apCostOfUsage) >0) {// Conditional 83 of FIG. 4
             If (mpz_cmp(apT, apSurplus) >0) { // Conditional 84 where
                                               // usage is near maximum allowable
                If (!apWarned) { // Conditional 85 of FIG. 4
                   apWarned = true; // Node 86 of FIG. 4
                   setWarnLED(true); // Node 87 of FIG. 4
                }
             }
          } else { // Conditional 83 detects maximum allowable usage
             deActivate( );
          }
       }
    } else { // Conditional 78 of FIG. 4 does not detect Usage State 52
       setUsageLED(false);
       setActiveUsage(false);
    }
 }
}
//End of Ap.c file
```

The current Trezor One wallet firmware version 1.7.3 does not provide functionality allowing the AP processor to retrieve the balance of its own Ethereum accounts directly, although it does provide a means for accessing balances via a USB connected external processor that must also be connected to the internet and the Trezor website. For this reason, and for purposes of the illustrated embodiment, Lessor 3 will be required to initiate a transaction from the Trezor One wallet corresponding to the Item Capital wallet account 10 and send an amount A (illustrated by nodes 96 and 97 of FIG. 4) to the same address for Item Capital account 10, during Activate interaction 8 of FIG. 1 and following activation by Lessor Key switch 128 of FIG. 5 being switched to logic level '1' 130. Because said transactional process will only allow said initiation if there is a sufficient balance in the IC account 10, it will securely satisfy the functionality of the VerifyAmount( ) function illustrated in nodes 96 and 76 of FIG. 4. The following modifications to the firmware will make this functionality possible, and will also treat any successful transaction initiation from the wallet to its own IC account 10 address as a special case where said transaction will not actually be executed on the blockchain network, but will instead lock out any further use of the wallet for transactional purposes (as illustrated in node 98) until after the AP returns to Inactive State 50 by node 99. It is anticipated that future technology will allow future implementations of VerifyAmount( ) 96 within claimed embodiments to be realized more elegantly. Lessor 3 would be notified during Supply interaction 5 that any attempts to send ERC-20 cryptocurrency from the wallet to its own IC account 10 will result in the above described modified behavior without completing execution of the transaction on the blockchain. Consequently, for this illustrated embodiment, successful transfers of cryptocurrency to IC account 10 are to be transacted from accounts external to the wallet device associated with IC account 10.

The enhancements to the file ethereum.c illustrated below support functionality of nodes 96, 97, and 76 of FIG. 4.

```
ethereum.c
// add the following after line 38
#include "ap.h"
const bignum256* const MIN_AMOUNT = <min amount> // <min amount>is predetermined
    // by Company 2, prior to Supply interaction 5, specifying a minimal amount of
    // cryptocurrency balance that must exist in Item Capital wallet 10 prior to
    // activation of lease of Item 1.
// add the following function definitions after line 448
//compare address[40] to ICADDRESS
static bool ap_compare_address(const char *address) {
    size_t len = strlen(address);
    If (len == 40) {
        // do nothing
    } else
    If (len == 42) {
        // check for "0x" prefix and strip it when required
        If (address[0] != '0') return false;
        If (address[1] != 'x' && address[1] != 'X') return false;
        address += 2;
    } else {
        return false;
    }
    return (strncmp(address, ICADDRESS, 40) == 0);
}
static bool ap_verify_amount(const uint8_t *value, uint32_t value_len) {
    // following is the function of nodes 96, 97 of FIG. 4
    uint8_t pad_val[32];
    memzero(pad_val, sizeof(pad_val));
    memcpy(pad_val + (32 - value_len), value, value_len);
    bn_read_be(pad_val, &apAmount);
    return (!bn_is_less(&apAmount, MIN_AMOUNT));
}
```

/*Add the following after line 556 of function ethereum_signing_init( ) in order to determine if this is a special "transaction" (described above) for verifying the amount for the balance of IC account M. If so, then the transaction is intercepted after the first confirmation request by the wallet, but before the second and final confirmation request confirming gas parameters, so that the transaction may then be canceled and processing will proceed back to the main loop appropriately.*/

```
if (ap_compare_address(msg->to)) { //determine if transaction is sending cryptocurrency to
        //IC wallet 10's address in an attempt to activate
    if (!ap_verify_amount(msg->value.bytes, msg->value.size) {
        //set amount A of node 97 and
        //determine if transaction amount is not sufficient to
        //meet minimum amount requirements.
        failedActivate( );
    } else {
        successfulActivate( );
    }
    //cancel transaction regardless of success or failure since this was an attempted
    //activation
    fsm_sendFailure(FailureType_Failure_ActionCancelled, NULL);
    ethereum_signing_abort( );
    return;
}
//End of changes to file ethereum.c
```

The enhancements to the file trezor.c illustrated below enhance the main program of the Trezor One firmware to support polling of the GPIO inputs, retrieving "activated" AP status from NVRAM, locking the wallet while activated, and general outer loop functionality.

---
trezor.c
---

```
//Add the following after line 33
#include "ap_ports.h"
#include "ap.h"
//Replace lines 120-123 of the main loop with the following
apActivated = storage_getAPstate( );
for (;;) {
apPortRead( );
if (!apActivated) {
    if (apPortState.LessorKeyActive) { // conditional 73 detects activation attempt
        initActivate( );
        apWaitVerify = true; //activated flag is set but apWaitVerify conditional 76
            // has not executed yet, waiting on Lessor 3
    } else if (apFailed) { //Conditional 76 has indicated failure
        If (apPortState.LessorKeyActive) {
            setFailedLED(true); /*Notify failure 92 as long as lessor key
                128 still activated '1' */
        }
        else { //Lessor 3 has now switched lessor key 128 to '0'
            setFailedLED(false); //Clear failed notification
            apFailed = false; //Clear failed flag
        }
    }
    // continue servicing normal wallet functions while not active
    usbPoll( );
    check_lock_screen( );
} else { //AP is in activated state
    If (apWaitVerify) { /* if still waiting on VerifyAmount( ) 96 continue servicing
            wallet transactions */
        If (!apPortState.LessorKeyActive) {
            // Lessor 3 has deactivated Lessor Switch 128
            apWaitVerify = false; // no need to wait if deactivated
            deActivate ( );
        }
        usbPoll( );
        check_lock_screen( );
    } else { // AP is now in Idle/Usage state loop so lock out USB and
        // wallet transactions 98
        if (!apPortStatelessorKeyActive) { //deactivation via transition 57
            deActivate( );
        } else {
            startFromIdle( ); //Start from Idle node 91
        }
    }
}
}
//End of changes to file trezor.c
```

---

What is claimed is:

1. A method of governing a stake in a usage entitlement financial instrument, performed by means of digital processes, the method comprising:

determining when an activate interaction is performed by a lessor of an item by means of detecting a first signal condition associated with the activate interaction using an autonomous processor system associated with the item, the autonomous processor system comprising elements including but not limited to a processor, a memory storage, a sequence of executable instructions being stored in a part of the memory storage, and at least one input port for detecting a plurality of signal conditions including said first signal condition;

determining an activate transaction amount of item capital for said item, by means of said autonomous processor system interfaced to a blockchain ledger including a means for reading a balance of an item capital blockchain ledger account associated with said item, wherein the item capital account is a part of the blockchain ledger, and wherein outgoing transactions from the item capital account are initiated by means of the autonomous processor system interface to the blockchain ledger;

locking said item capital account, by inhibiting the means for initiating outgoing transactions from the item capital account;

allowing an active usage of said item, using the autonomous processor including a means for processing digital signals required for the active usage of said item;

proceeding by means of processing the executable instructions of the autonomous processor system, starting with an accumulated balance of zero, to accumulate a measure of said active usage, in units equivalent to the units of said item capital, into the accumulated balance, in an iterative manner, with the accumulated balance acting as an initial value for a next iteration, determining if a first conditional is satisfied wherein said accumulated balance is equal to or greater than said determining an activate amount of item capital, determining if a second conditional is satisfied wherein a return interaction is performed for the item by means of detecting a second signal condition associated with the return interaction, using said autonomous processor system including said at least one input port for detecting a plurality of signal conditions, wherein said second signal condition is one of said plurality of signal conditions, and ending said proceeding by the earliest determining of the satisfaction of either said first conditional or said second conditional;

preventing the active usage of said item, by means of the autonomous processor system, including said means for processing digital signals required for active usage of said item;

unlocking said item capital account by ending said inhibiting the means for initiating outgoing transactions and enabling a means for initiating transactions from said item capital account to a lessor capital pool account associated with the lessor, wherein the lessor capital pool account is a part of the blockchain ledger;

whereby said item capital represents a stake in a usage entitlement financial instrument limiting maximum said active usage following any said activate interaction; and whereby said blockchain ledger, while operating on a substantially trustless basis, the trustless basis being enhanced by elements of said autonomous processor system that do not require substantial trust in humans for the operation of said elements.

2. The method of claim 1, wherein the item capital is a cryptocurrency.

3. The method of claim 2, wherein the cryptocurrency is a fungible, divisible cryptocurrency token.

4. The method of claim 3, wherein the token is an ethereum standard token.

5. The method of claim 1, wherein the item comprises a video processing device.

6. The method of claim 1, wherein the item comprises a transportation vehicle.

7. The method of claim 6, wherein the measure of active usage comprises a distance traveled by said vehicle.

8. The method of claim 1, wherein the item comprises real estate.

9. The method of claim 1, wherein the item comprises a digital media, wherein said measure of said active usage is measured by a digital media player playing the media, and wherein the digital media player is interfaced to said autonomous processor system by a means of the digital media player interface allowing the measure of active usage to be read by the autonomous processor system.

10. The method of claim 9, wherein the digital media player is a part of a settop box functionality.

11. The method of claim 9, wherein said digital media, said lessor, and said transaction from said item capital account to the lessor capital account are registered in a registry by means of a distribution model for digital media, whereby active usage of a plurality of digital media may be tracked for a plurality of lessors.

12. An autonomous processor system governing a stake in a usage entitlement financial instrument comprising:

a state machine, the state machine transitioning between states including:
  an inactive state,
  at least one active state;

at least one input port for detecting a plurality of signal conditions including:
  a first signal condition associated with an activate interaction performed by a lessor of an item under lease, causing said state machine to transition to one of said at least one active state, and
  a second signal condition associated with a return interaction performed for the item under lease, causing said state machine to transition to said inactive state;

a means for processing a plurality of signal conditions controlling active usage of the item, wherein the signal conditions controlling active usage include:
  a third signal condition for allowing the active usage, and
  a fourth signal condition for preventing the active usage,
    wherein said third signal condition and said fourth signal condition are mutually exclusive;

an interface to a blockchain ledger, interfacing with:
  a first account associated with item capital of the item, being a part of the blockchain ledger, and
  a second account associated with a lessor capital pool of the lessor, being a part of the blockchain ledger,
  wherein the interface provides:
    a first means for reading a balance of the first account,
    a second means for initiating transactions from the first account to the second account, and
    a third means for inhibiting outgoing transactions from the first account;

a means for measuring active usage of the item;

a memory, the memory comprising storage of:
  an activate amount of item capital,
  an accumulated balance in units of said item capital, and
  executable instructions programmed to perform an operational sequence of steps comprising:
    a. proceed, wherein the proceed is conditional on said state machine transitioning out of said inactive state,
    b. store the activate amount of item capital, determined by said first means,
    c. lock the item capital account by said third means,
    d. allow the active usage of the item by setting said third signal condition,
    e. proceed, starting with setting said accumulated balance to zero, to accumulate said active usage, using said means for measuring active usage, converting the active usage to units equivalent to said units of said item capital, into said accumulated balance, in an iterative manner,
      determine if a first conditional is satisfied wherein said accumulated balance is equal to or greater than said activate amount,
      set said state machine to said inactive state following determining the first conditional is satisfied,
      determine if a second conditional is satisfied wherein said state machine is transitioned to said inactive state,
      end said proceed to accumulate in an iterative manner following determining the second conditional is satisfied,
    f. prevent said active usage of the item by setting said fourth signal condition,
    g. unlock the item capital account by said second means, h. jump to the operational step of said proceed, wherein the proceed is conditional on said state machine transitioning out of said inactive state; and a processor,
the processor interconnected with:
said state machine,
said at least one input port,
said means for processing a plurality of signal conditions,
said interface to a blockchain ledger,
said means for measuring active usage, and
said memory,
wherein the processor executes said executable instructions,
beginning with the operational step of said proceed, wherein the proceed is conditional on said state machine transitioning out of said inactive state;
whereby said item capital represents a stake in a usage entitlement financial instrument limiting maximum said active usage following any said activate interaction; and
whereby said blockchain ledger, while operating on a substantially trustless basis, the trustless basis being enhanced by elements of said operational sequence of steps, wherein the elements do not require substantial trust in humans for the operation of said elements.

13. The system of claim 12 wherein the item is any of: a digital file, or a digitized stream of data.

14. The system of claim 13 wherein the item comprises digital media, and the autonomous processor system includes an interface to a media player wherein the interface provides said means for measuring active usage of the digital media.

15. The system of claim 12 wherein the item is a video processing device, and wherein the measure of active usage comprises a count of a plurality of frames of the video processed.

16. The system of claim 12, wherein the item is a transportation vehicle, and wherein the measure of active usage comprises a distance traveled by the vehicle.

17. The system of claim 12, wherein the item comprises real estate, and wherein the signal conditions controlling active usage compose a means of regulating access to said real estate.

18. A method of trustless provisioning of item usage governed by a usage entitlement financial instrument, the method comprising:
acquiring a first amount of a usage entitlement financial instrument, by means of transferring the first amount to a balance of a lessor capital account of a blockchain ledger;
activating a second amount of said usage entitlement financial instrument, by means of transferring the second amount, being a part of the balance of said lessor capital account, to a balance of an item capital account, the item capital account being an account of said blockchain ledger, wherein the item capital account is associated with an item;
activating an autonomous processor system associated with said item by means of determining a first signaling of an at least one input port of the autonomous processor system, causing a state of the autonomous processor system to be in an at least one active state based on a result of the determining the first signaling, said activating an autonomous processor system causing the following automated operational steps to be performed by the autonomous processor system:
a. locking said item capital account, wherein outgoing transactions from the item capital account are prevented by a means of inhibiting an interface between said autonomous processer system and said blockchain ledger,
b. allowing an active usage of said item by a means for processing digital signals required for the active usage of said item,
c. proceeding, starting with an accumulated balance of zero, to accumulate a measure of said active usage, in units equivalent to units of said usage entitlement financial instrument, into the accumulated balance, in an iterative manner, with the accumulated balance acting as an initial value for a next iteration,
determining if a first conditional is satisfied wherein said accumulated balance is equal to or greater than said balance of the item capital account,
determining if a second conditional is satisfied wherein said state of the autonomous processor system is an inactive state,
ending said proceeding by the earliest determining of the satisfaction of either said first conditional or said second conditional,
d. preventing said active usage of said item by said means for processing digital signals required for the active usage of said item,
e. unlocking said item capital account, wherein outgoing transactions from the item capital account are allowed by means of the interface between said autonomous processor system and said blockchain ledger, and
f. ending said automated operational steps;
processing a return interaction of the item by means of determining a second signaling of the at least one input port of said autonomous processor system, causing said state of the autonomous processor system to be in an inactive state based on a result of the determining the second signaling, and allowing transfer of the balance of the item capital account to the balance of the lessor capital pool account by means of said interface between the autonomous processor system and the blockchain ledger, wherein said processing a return interaction may occur concurrently with, or following, said automated operational steps;
whereby said blockchain ledger, while operating on a substantially trustless basis, the trustless basis being enhanced by said automated operational steps of the autonomous processor system that do not require substantial trust in humans for the automated operation.

19. The method of claim 18, wherein the automated operational step ending with said ending said proceeding is followed by an automated operational step of determining a surplus amount being the result of subtracting said accumulated balance from said second amount, and wherein said processing a return interaction includes determining a refund ratio, the ratio being the surplus amount divided by the second amount, whereby the accumulated balance comprises a used portion of the activated active usage and the surplus amount comprises an unused portion of the activated active usage, and whereby the refund ratio may be used to establish a refund for unused activated active usage for a lessee of said item.

20. The method of claim 19, wherein said item is a digital media, said lessor capital pool is a distributor capital pool, and said processing a return interaction includes recording said accumulated balance, and said surplus amount to a registry by means of a distribution model for digital media under lease, whereby active usage of a plurality of digital media may be tracked for a plurality of distributors.

* * * * *